United States Patent
Chen

(10) Patent No.: US 11,892,760 B2
(45) Date of Patent: Feb. 6, 2024

(54) ACTUATOR DEVICE, PROJECTION DEVICE AND PROJECTION METHOD

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 59 days.

(21) Appl. No.: 17/845,987

(22) Filed: Jun. 21, 2022

(65) Prior Publication Data
US 2022/0413369 A1    Dec. 29, 2022

(30) Foreign Application Priority Data
Jun. 24, 2021 (CN) .......................... 202110701729.1

(51) Int. Cl.
*G03B 21/14* (2006.01)
(52) U.S. Cl.
CPC .................................. *G03B 21/142* (2013.01)
(58) Field of Classification Search
CPC .... H04N 9/315; H04N 9/3105; H04N 9/3141; H04N 9/3188; G03B 21/008; G03B 21/22; G03B 21/28; G03B 21/142; G03B 21/145; G02B 26/0816; G02B 26/0825; G02B 26/0833; G02B 26/0841; G02B 26/0891; G02B 26/10; G02B 26/101; G02B 26/106
See application file for complete search history.

(56) References Cited

U.S. PATENT DOCUMENTS

| | | | |
|---|---|---|---|
| 2006/0132937 A1* | 6/2006 | Choi | G02B 7/025 359/824 |
| 2008/0117728 A1* | 5/2008 | Kim | G11B 7/0956 |
| 2020/0272041 A1* | 8/2020 | Wu | G03B 21/22 |

FOREIGN PATENT DOCUMENTS

CN        110068906        7/2019

* cited by examiner

*Primary Examiner* — Sultan Chowdhury
(74) *Attorney, Agent, or Firm* — JCIPRNET

(57) ABSTRACT

The disclosure provides a projection device, an actuator device thereof, and a projection method adapted for the actuator device. The projection method includes disposing an optical element in a frame body, and disposing a driving assembly between a base and the frame body; controlling the driving assembly to drive the frame body by a signal so that the optical element reciprocally swings relative to the base based on a first, a second, and a third moving shaft. The signal includes a first driving signal corresponding to the first moving shaft, a second driving signal corresponding to the second moving shaft, and a third driving signal corresponding to the third moving shaft. The first and the second driving signal have a first frequency; the third driving signal has a second frequency different from the first frequency. The phase difference between the first and the second driving signal is not equal to zero.

22 Claims, 24 Drawing Sheets

ACTUATOR DEVICE, PROJECTION DEVICE AND PROJECTION METHOD

CROSS-REFERENCE TO RELATED APPLICATION

This application claims the priority benefit of China application serial no. 202110701729.1, filed on Jun. 24, 2021. The entirety of the above-mentioned patent application is hereby incorporated by reference herein and made a part of this specification.

BACKGROUND

Technical Field

The disclosure relates to an actuator device, a projection device, and a projection method.

Description of Related Art

With the improvement of video quality of cable TV or network streaming, demands for high-resolution projectors are gradually increasing from people. To increase the resolution of a projector, an actuator can be disposed at a proper position in the projector, so the beam generated by the projector passes through the optical element on the actuator. When the actuator is in operation, the optical element carried by the actuator can reciprocally swing, the beam passing through the optical element is projected to different positions, and thereby the effect of increasing the resolution of the image projected by the projector is achieved. Currently, most actuators on the market are single-axis actuators or dual-axis actuators, so the resolution of the projector can only be increased by 1 to 4 times.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an actuator device, a projection device, and a projection method capable of increasing the quantity of moving shafts of the actuator device, and thereby the resolution of the projection device is increased.

The other objectives and advantages of the disclosure can be further understood from the technical features disclosed in the disclosure.

In order to achieve one or part or all of the above objectives or other objectives, an embodiment of the disclosure provides an actuator device including a base, a frame body, an optical element, at least one driving assembly, and a controller. The frame body is disposed in the base. The optical element is disposed in the frame body. The at least one driving assembly is disposed between the base and the frame body. The controller is coupled to the at least one driving assembly. The controller is adapted to control the at least one driving assembly to drive the frame body by a signal so that the optical element reciprocally swings relative to the base based on a first moving shaft, a second moving shaft, and a third moving shaft. The signal includes a first driving signal corresponding to the first moving shaft, a second driving signal corresponding to the second moving shaft, and a third driving signal corresponding to the third moving shaft. The first driving signal and the second driving signal have a first frequency, and the third driving signal has a second frequency different from the first frequency. A phase difference between the first driving signal and the second driving signal is not equal to zero.

In order to achieve one or part or all of the above objectives or other objectives, another embodiment of the disclosure provides a projection device including an illumination system, a light valve, a projection lens, and an actuator device. The illumination system is adapted to emit an illumination beam. The light valve is located on a transmission path of the illumination beam, and the light valve is adapted to convert the illumination beam into an image beam. The projection lens is located on a transmission path of the image beam, and the projection lens is adapted to project the image beam. The actuator device is located on a transmission path of the image beam, and the actuator device is disposed between the light valve and the projection lens or disposed in the projection lens. The actuator device includes a base, a frame body, an optical element, at least one driving assembly, and a controller. The frame body is disposed in the base. The optical element is disposed in the frame body. The at least one driving assembly is disposed between the base and the frame body. The controller is coupled to the at least one driving assembly. The controller is adapted to control the at least one driving assembly to drive the frame body by a signal so that the optical element reciprocally swings relative to the base based on a first moving shaft, a second moving shaft, and a third moving shaft. The signal includes a first driving signal corresponding to the first moving shaft, a second driving signal corresponding to the second moving shaft, and a third driving signal corresponding to the third moving shaft. The first driving signal and the second driving signal have a first frequency, and the third driving signal has a second frequency different from the first frequency. A phase difference between the first driving signal and the second driving signal is not equal to zero.

In order to achieve one or part or all of the above objectives or other objectives, another embodiment of the disclosure provides a projection method, adapted for an actuator device. The actuator device includes a base, a frame body, an optical element, and at least one driving assembly, and the projection method includes the steps as follows. The frame body is disposed in the base, the optical element is disposed in the frame body, and the at least one driving assembly is disposed between the base and the frame body. The at least one driving assembly is controlled to drive the frame body by a signal so that the optical element reciprocally swings relative to the base based on a first moving shaft, a second moving shaft, and a third moving shaft. The signal includes a first driving signal corresponding to the first moving shaft, a second driving signal corresponding to the second moving shaft, and a third driving signal corresponding to the third moving shaft. The first driving signal and the second driving signal have a first frequency, and the third driving signal has a second frequency different from the first frequency. A phase difference between the first driving signal and the second driving signal is not equal to zero.

Based on the above, the embodiments of the disclosure have at least one of the following advantages or effects. In the embodiments of the disclosure, the actuator device of the disclosure may include at least three moving shafts. The actuator device can control the optical element to reciprocally swing based on at least three moving shafts according to the corresponding driving frequency, and thereby the resolution of the projection device is increased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
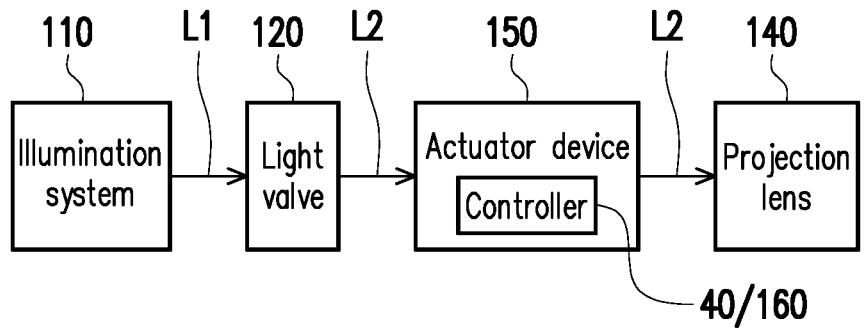
FIG. 1A is a schematic view of a projection device according to an embodiment of the disclosure.

FIG. 1A is a schematic view of a projection device 100A according to an embodiment of the disclosure. The projection device 100A may include an illumination system 110, a light valve 120, a projection lens 140, and an actuator device 150.

The illumination system 110 may be used to provide an illumination beam L1. The light valve 120 is located on the transmission path of the illumination beam L1. The light valve 120 can be used to convert the illumination beam L1 into an image beam L2. For example, the light valve 120 is a reflective light modulator, such as a liquid crystal on silicon panel (LCoS panel) or a digital micro-mirror device (DMD). For example, the light valve 120 may also be a transmissive light modulator, such as a transparent liquid crystal panel, an electro-optical modulator, a magneto-optic modulator, an acousto-optic modulator (AOM), or the like. The projection lens 140 is located on the transmission path of the image beam L2. The projection lens 140 can be used to project the image beam L2. For example, the projection lens 140 can project the image beam L2 onto the wall or screen outside the projection device 100A. For example, the projection lens 140 is a combination of one or more optical lenses having refractive power. For example, the projection lens 140 may include a combination of non-planar lenses, such as a biconcave lens, a biconvex lens, a meniscus lens, a convex-concave lens, a plano-convex lens, or a plano-concave lens. In an embodiment, the projection lens 140 may also include a planar optical lens. The actuator device 150 is located on the transmission path of the image beam L2, and the actuator device 150 may be disposed between the light valve 120 and the projection lens 140. The actuator device 150 may include an optical element. The optical element may be used to increase the resolution of the image beam. In another embodiment, the actuator device 150 may be disposed within the projection lens 140 (not shown).

Figure 1B:
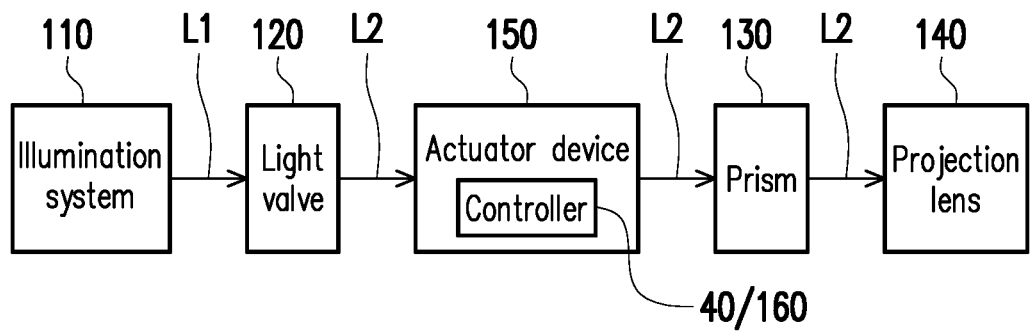
FIG. 1B and FIG. 1C respectively are schematic views of other projection devices according to other embodiments of the disclosure.
Figure 1C:
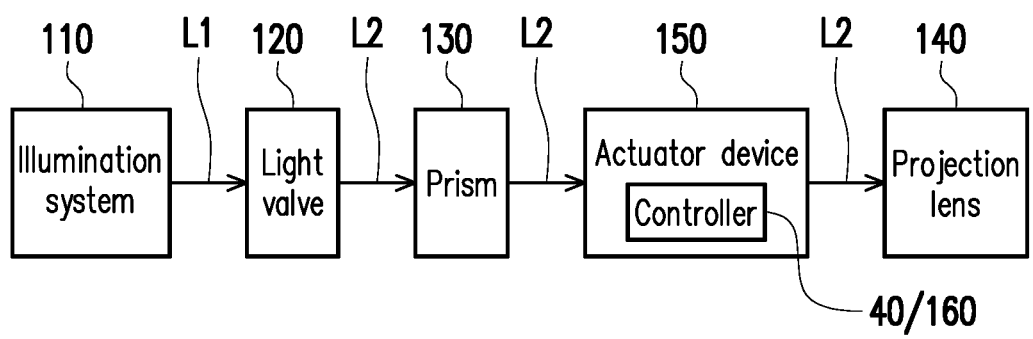

FIG. 1B and FIG. 1C respectively are schematic views of a projection device 100B and a projection device 100C according to other embodiments of the disclosure. Referring to FIG. 1A to FIG. 1C, the projection device 100B of FIG. 1B and the projection device 100C of FIG. 1C are similar to the projection device 100A of FIG. 1A, and the differences between the projection devices 100B and 100C and the projection device 100A are further illustrated as follows. Same reference numerals refer to similar components, which is not iterated herein. In the embodiment of FIG. 1A, the projection device 100A may be non-telecentric. The non-telecentric projection device 100A of FIG. 1A may not include a prism. In the embodiments of FIG. 1B and FIG. 1C, the projection devices 100B and 100C may be telecentric. Compared with the non-telecentric projection device 100A, the telecentric projection devices 100B and 100C may further include a prism 130. The prisms 130 of the projection devices 100B and 100C are located on the transmission path of the image beam L2, and the prisms 130 may be disposed between the light valve 120 and the projection lens 140. In the embodiment of FIG. 1B, the actuator device 150 may be disposed between the light valve 120 and the prism 130, and in the embodiment of FIG. 1C, the actuator device 150 may be disposed between the prism 130 and the projection lens 140. Moreover, under the architecture of the telecentric projection device 100C, in other embodiments not shown, the actuator device 150 may also be disposed in the projection lens 140.

Figure 2A:
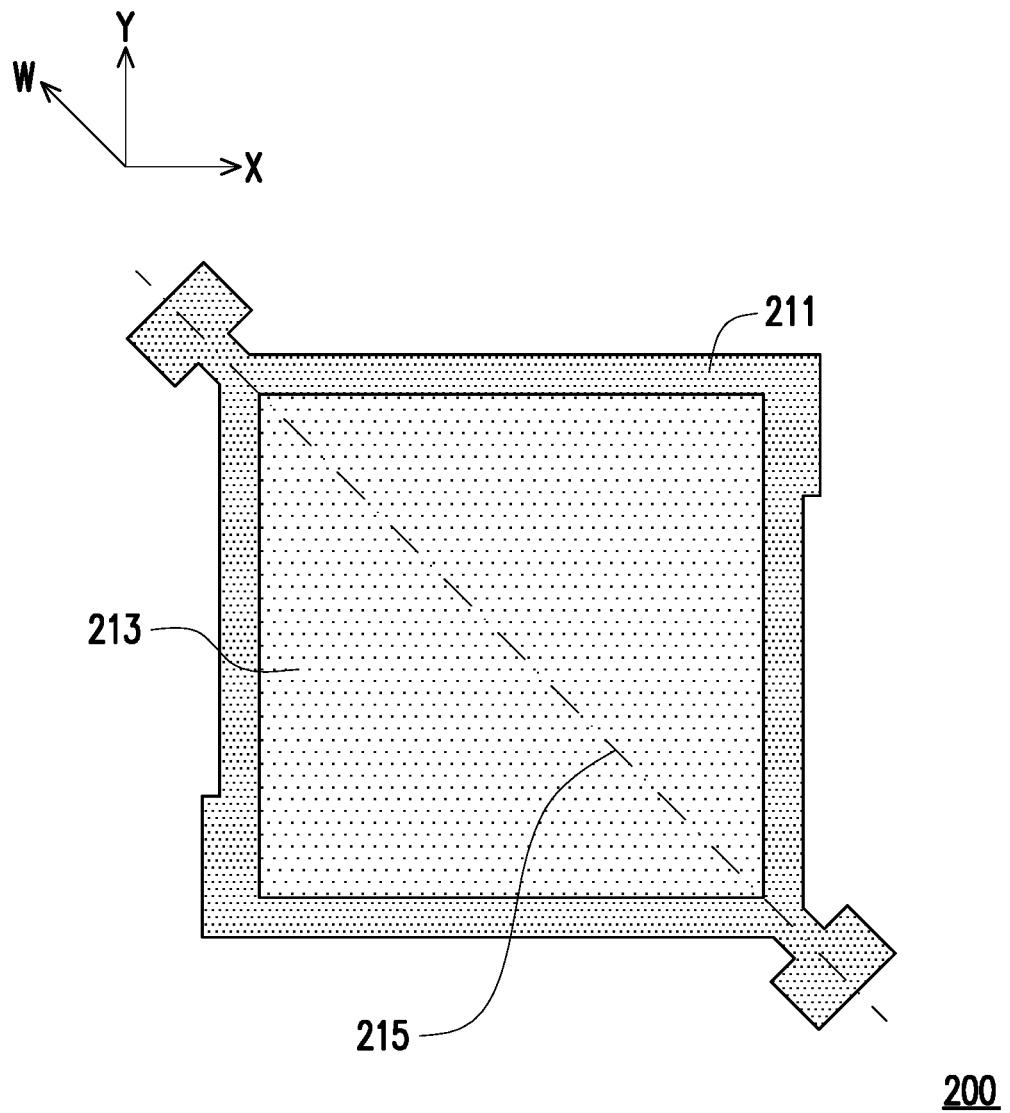
FIG. 2A is a top view of a single-axis actuator device according to a comparative example of the prior art.
Figure 2B:
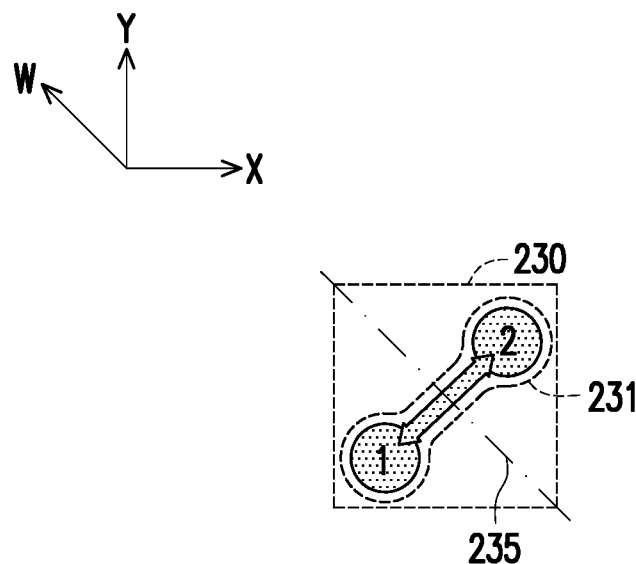
FIG. 2B is a schematic view of a pixel corresponding to FIG. 2A.
Figure 2C:
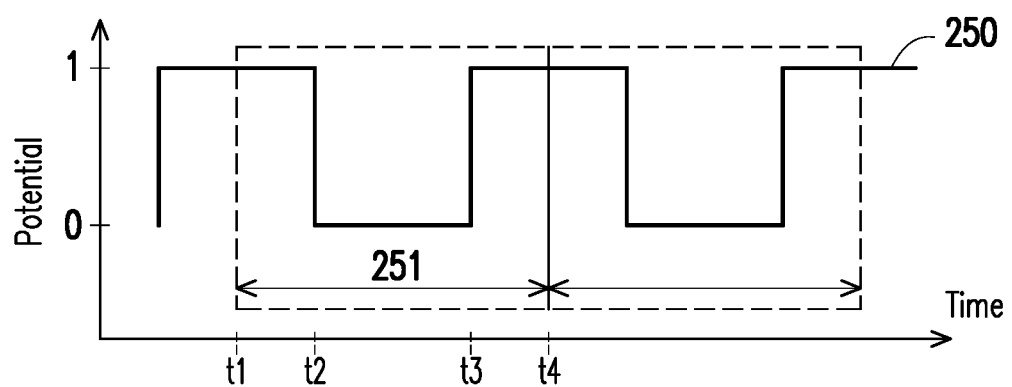
FIG. 2C is a schematic view of a driving signal corresponding to FIG. 2A.

For readers to better and clearly understand the difference between the technology of the disclosure and the prior art, a comparative example of the prior art is illustrated as follows. FIG. 2A is a top view of a single-axis actuator device 200 according to a comparative example of the prior art. FIG. 2B is a schematic view of a pixel 231 corresponding to FIG. 2A. FIG. 2C is a schematic view of a driving signal 250 corresponding to FIG. 2A. The driving signal 250 is an analog signal or a digital signal, for example. Referring to FIG. 2A, FIG. 2B, and FIG. 2C, the actuator device 200 may include a frame body 211 and an optical element 213, and the optical element 213 may be disposed in the frame body 211. If the actuator device 200 has a moving shaft 215 parallel to the W direction, the W direction may be parallel to the angular bisector of the negative X-axis direction and the Y-axis direction (or the angular bisector of the X-axis direction and the Y-axis direction). The image beam can be transmitted to a virtual plane 230 by the optical element 213 and form a light spot on the virtual plane 230. When the actuator device 200 receives the driving signal 250, the actuator device 200 can drive the frame body 211 so that the optical element 213 reciprocally swings based on the moving shaft 215. When the optical element 213 reciprocally swings based on the moving shaft 215, the light spot formed by the image beam on the virtual plane 230 can move back and forth along the radial direction of the axis 235, the axis 235 is the projection of the moving shaft 215 on the virtual plane 230, and the axis 235 may be parallel to the W direction.

A time interval 251 may be a period in which the pixel 231 is generated. Taking the time interval 251 as an example, at time t1, the driving signal 250 is maintained at a high potential (shown as "1"), so the driving signal 250 may not drive the frame body 211 so that the optical element 213 does not swing about the moving shaft 215. Accordingly, the light spot formed by the image beam on the virtual plane 230 can stay at position 1. At time t2, the driving signal 250 that changes from a high potential to a low potential (shown as "0") can drive the frame body 211 so that the optical element 213 swings about the moving shaft 215 toward the negative direction (which can be regarded as swinging counterclockwise). Accordingly, the light spot formed by the image beam on the virtual plane 230 can move along the X-axis direction and the Y-axis direction to position 2. At time t3, the driving signal 250 that changes from a low potential to a high potential can drive the frame body 211 so that the optical element 213 swings about the moving shaft 215 toward the positive direction (which can be regarded as swinging clockwise). Accordingly, the light spot formed by the image beam on the virtual plane 230 can move along the negative X-axis direction and the negative Y-axis direction to position 1. At time t4, the driving signal 250 is maintained at a high potential, so the light spot formed by the image beam on the virtual plane 230 can stay at position 1. Based on the above, at the time interval 251, the light spot formed by the image beam on the virtual plane 230 can move between position 1 and position 2 to form the pixel 231.

Figure 3A:
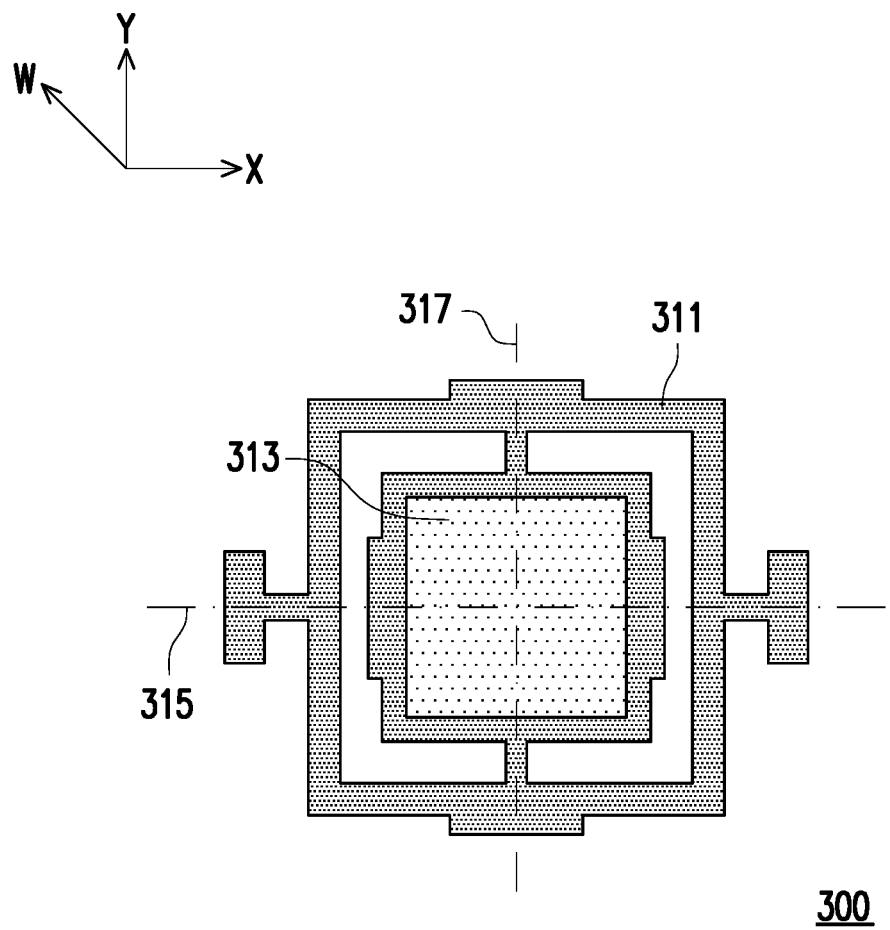
FIG. 3A is a top view of a dual-axis actuator device according to a comparative example of the prior art.
Figure 3B:
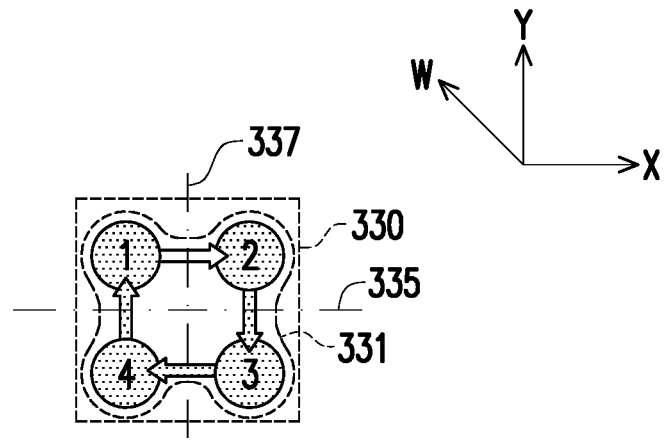
FIG. 3B is a schematic view of a pixel corresponding to FIG. 3A.
Figure 3C:
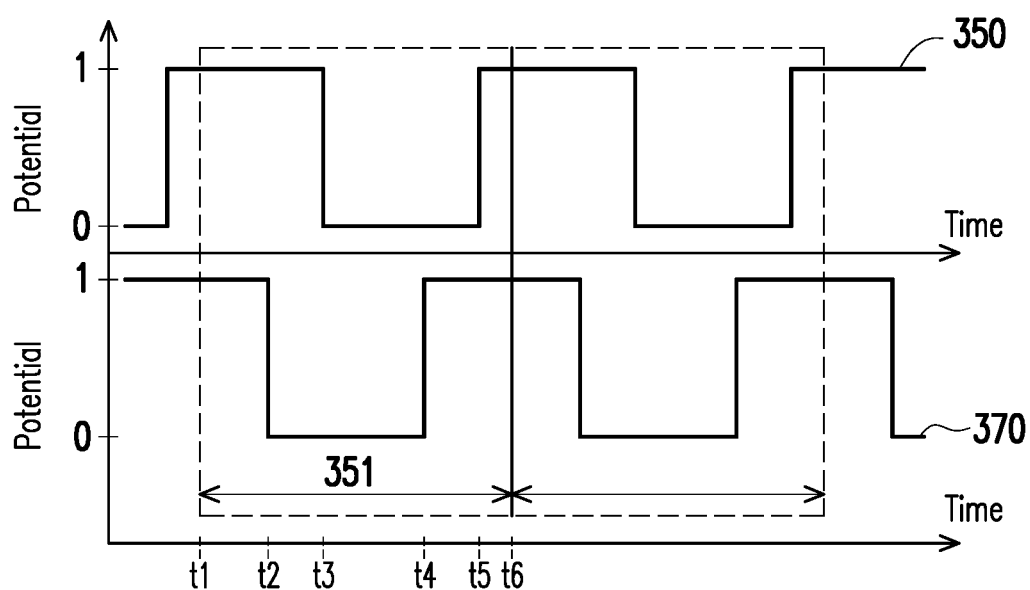
FIG. 3C is a schematic view of driving signals corresponding to FIG. 3A.

FIG. 3A is a top view of a dual-axis actuator device 300 according to a comparative example of the prior art. FIG. 3B is a schematic view of a pixel 331 corresponding to FIG. 3A. FIG. 3C is a schematic view of driving signals 350 and 370 corresponding to FIG. 3A. The driving signal 350 (or the driving signal 370) is an analog signal or a digital signal, for example. Referring to FIG. 3A, FIG. 3B, and FIG. 3C, the actuator device 300 may include a frame body 311 and an optical element 313, and the optical element 313 may be disposed in the frame body 311. If the actuator device 300 has a moving shaft 315 parallel to the X-axis direction and a moving shaft 317 parallel to the Y-axis direction, the image beam can be transmitted by the optical element 313 to a virtual plane 330 and form a light spot on the virtual plane 330. When the actuator device 300 receives the driving signal 350, the actuator device 300 can drive the frame body 311 so that the optical element 313 reciprocally swings based on the moving shaft 315. When the optical element 313 reciprocally swings based on the moving shaft 315, the light spot formed by the image beam on the virtual plane 330 can move back and forth along the radial direction of the axis 335, the axis 335 is the projection of the moving shaft 315 on the virtual plane 330, and the axis 335 may be parallel to the X-axis direction. On the other hand, when the actuator device 300 receives the driving signal 370, the actuator device 300 can drive the frame body 311 so that the optical element 313 reciprocally swings based on the moving shaft 317. When the optical element 313 reciprocally swings based on the moving shaft 317, the light spot formed by the image beam on the virtual plane 330 can move back and forth along the radial direction of the axis 337, the axis 337 is the projection of the moving shaft 317 on the virtual plane 330, and the axis 337 may be parallel to the Y-axis direction.

The frequencies of the driving signal 350 and the driving signal 370 may be the same, that is, the speed of the optical element 313 while reciprocally swinging based on the moving shaft 315 and the speed of the optical element 313 while reciprocally swinging based on the moving shaft 317 may be the same. Moreover, the phases of the driving signal 350 and the driving signal 370 may be different. In the embodiment, it is assumed that the phase difference between the driving signal 350 and the driving signal 370 is 90 degrees.

A time interval 351 may be a period in which the pixel 331 is generated. Taking time interval 351 as an example, at time t1, the driving signal 350 maintained at a high potential may not drive the frame body 311 so that the optical element 313 does not swing about the moving shaft 315. Accordingly, the light spot formed by the image beam on the virtual plane 330 may not move along the radial direction of the axis 335. On the other hand, the driving signal 370 also maintained at a high potential may not drive the frame body 311 so that the optical element 313 does not swing about the moving shaft 317. Accordingly, the light spot formed by the image beam on the virtual plane 330 can move toward the negative X-axis direction. Therefore, at time t1, the light spot on the virtual plane 330 may not move along the radial direction of the axis 337 but stay at position 1.

At time t2, the driving signal 350 is maintained at a high potential, so the driving signal 350 may not drive the frame body 311 so that the optical element 313 does not swing about the moving shaft 315. Accordingly, the light spot formed by the image beam on the virtual plane 330 may not move along the radial direction of the axis 335. On the other hand, the driving signal 370 that changes from a high potential to a low potential can drive the frame body 311 so that the optical element 313 swings about the moving shaft 317 toward the negative direction (which can be regarded as swinging counterclockwise). Accordingly, the light spot formed by the image beam on the virtual plane 330 can move toward the X-axis direction. Therefore, at time t2, the light spot on the virtual plane 330 may move toward the X-axis direction and finally stay at position 2.

At time t3, the driving signal 350 that changes from a high potential to a low potential can drive the frame body 311 so that the optical element 313 swings about the moving shaft 315 toward the negative direction. Accordingly, the light spot formed by the image beam on the virtual plane 330 can move toward the negative Y-axis direction. The driving signal 370 is maintained at a low potential, so the driving signal 370 may not drive the frame body 311 so that the optical element 313 does not swing about the moving shaft 317. Accordingly, the light spot formed by the image beam on the virtual plane 330 may not move along the radial direction of the axis 337. Therefore, at time t3, the light spot on the virtual plane 330 may move toward the negative Y-axis direction and finally stay at position 3.

At time t4, the driving signal 350 is maintained at a low potential, so the driving signal 350 may not drive the frame body 311 so that the optical element 313 does not swing about the moving shaft 315. Accordingly, the light spot formed by the image beam on the virtual plane 330 may not move along the radial direction of the axis 335. On the other hand, the driving signal 370 that changes from a low potential to a high potential can drive the frame body 311 so that the optical element 313 swings about the moving shaft 317 toward the positive direction (which can be regarded as swinging clockwise). Accordingly, the light spot formed by the image beam on the virtual plane 330 may move toward the negative X-axis direction. Therefore, at time t4, the light spot on the virtual plane 330 may move toward the negative X-axis direction and finally stay at position 4.

At time t5, the driving signal 350 that changes from a low potential to a high potential can drive the frame body 311 so that the optical element 313 swings about the moving shaft 315 toward the positive direction. Accordingly, the light spot formed by the image beam on the virtual plane 330 can move toward the Y-axis direction. On the other hand, the driving signal 370 is maintained at a high potential, so the driving signal 350 may not drive the frame body 311 so that the optical element 313 does not swing about the moving shaft 317. Accordingly, the light spot formed by the image beam on the virtual plane 330 may not move along the radial direction of the axis 337. Therefore, at time t5, the light spot on the virtual plane 330 may move toward the Y-axis direction and finally stay at position 1.

At time t6, the driving signal 350 is maintained at a high potential, so the driving signal 370 may not drive the frame body 311 so that the optical element 313 does not swing about the moving shaft 315. Accordingly, the light spot formed by the image beam on the virtual plane 330 may not move along the radial direction of the axis 335. On the other hand, the driving signal 370 is maintained at a high potential, so the driving signal 350 may not drive the frame body 311 so that the optical element 313 does not swing about the moving shaft 317. Accordingly, the light spot formed by the image beam on the virtual plane 330 may not move along the radial direction of the axis 337. Therefore, at time t6, the light spot on the virtual plane 330 may not move but stay at position 1.

According to the comparative example of FIG. 2A, FIG. 2B, and FIG. 2C, in the single-axis actuator device 200, the light spot formed by the image beam on the virtual plane 220 can move between two positions at most, and thereby the resolution of the image beam is increased. According to the comparative example of FIG. 3A, FIG. 3B, and FIG. 3C, in the dual-axis actuator device 300, the light spot formed by the image beam on the virtual plane 330 can move around four positions at most, and thereby the resolution of the image beam is further increased. However, currently, the resolution that can be increased by the prior art solutions is limited. If the quantity of the moving shafts of the actuator device can be increased, the resolution of the image beam of the projection device can be further improved.

Figure 4A:
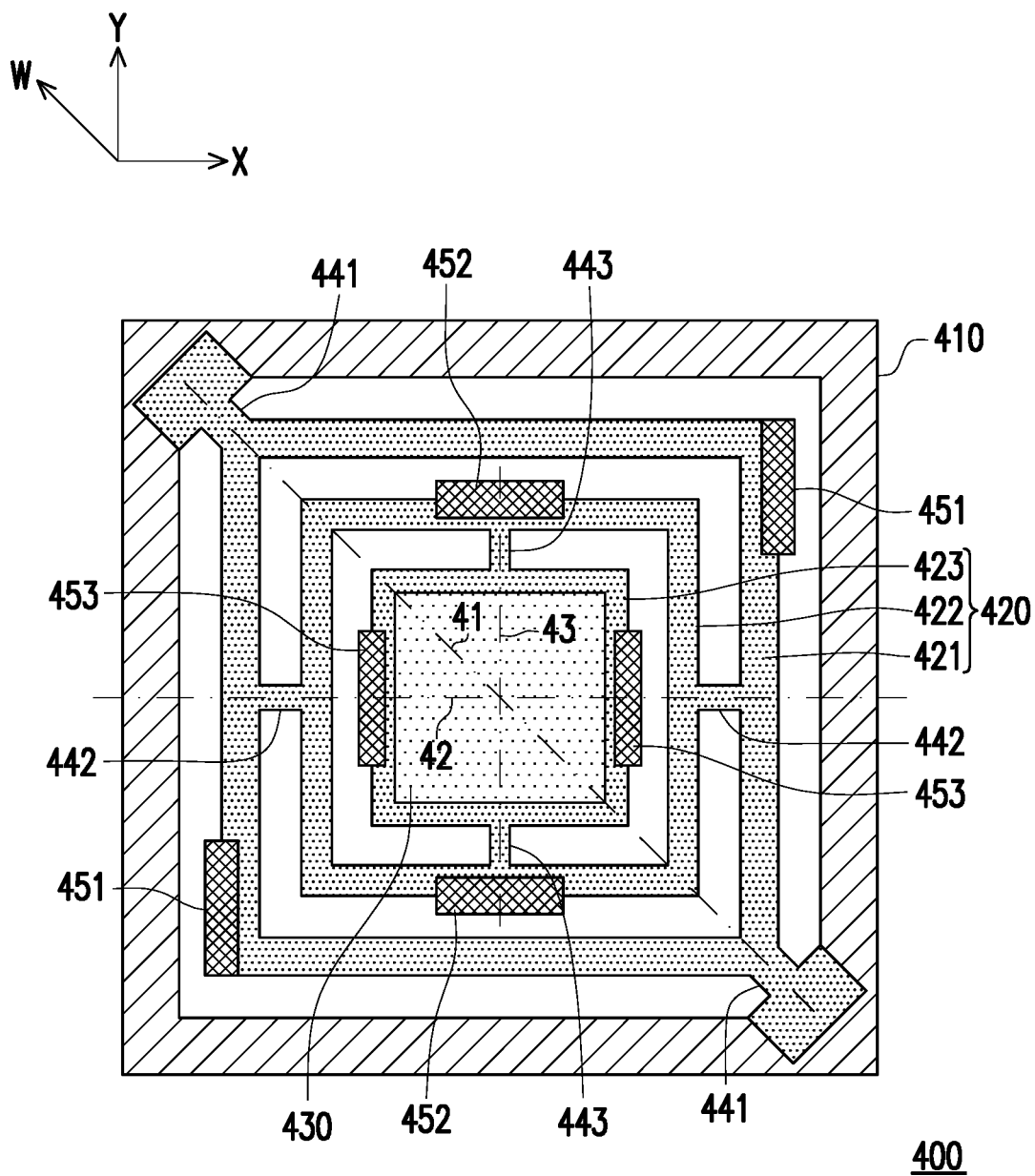
FIG. 4A is a top view of a three-axis actuator device according to an embodiment of the disclosure.
Figure 4B:
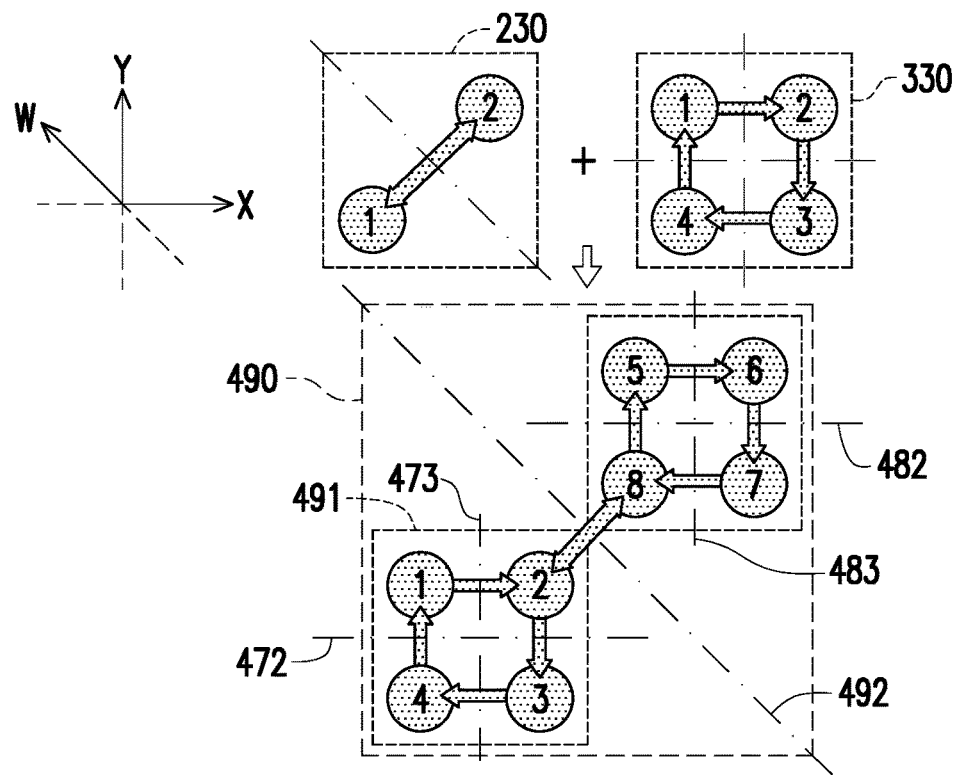
FIG. 4B is a schematic view of a pixel of the actuator device corresponding to FIG. 4A.
Figure 4C:
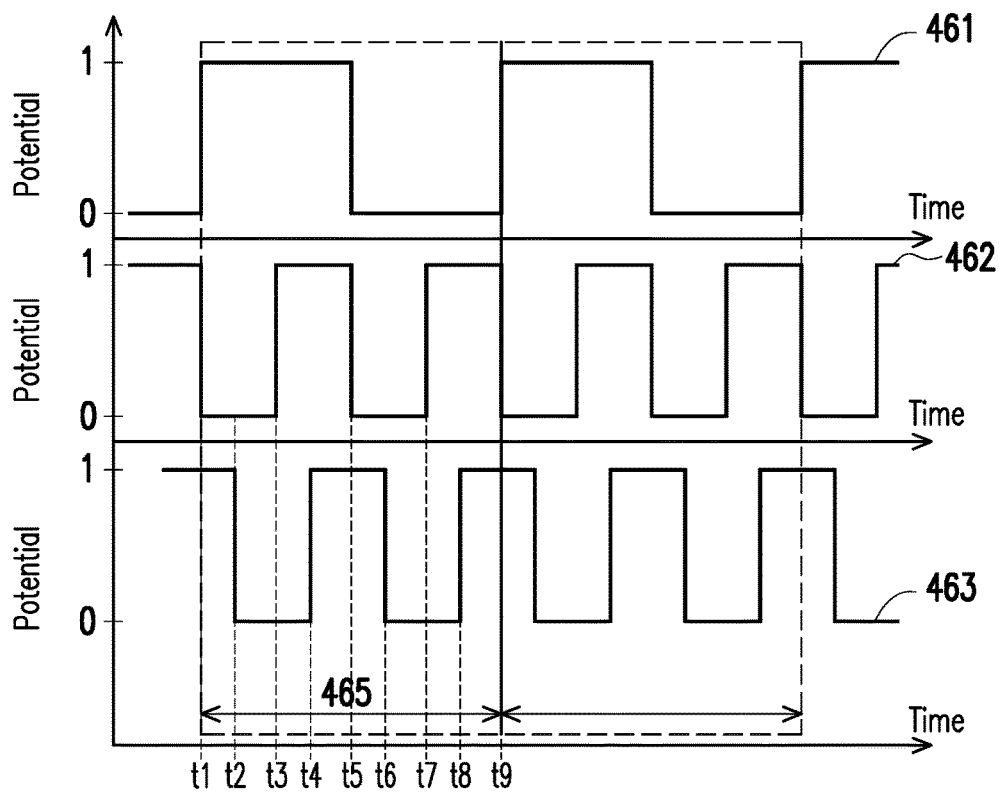
FIG. 4C is a schematic view of a driving signal of the actuator device corresponding to FIG. 4A.

Referring to FIG. 1A to FIG. 1C, the actuator device 150 in FIG. 1A to FIG. 1C is a three-axis actuator device 400 in FIG. 4A, for example. In other words, the actuator device 400 of FIG. 4A can be applied to any one of the projection device 100A of FIG. 1A to the projection device 100C of FIG. 1C. Alternatively, the actuator device 400 of FIG. 4A may also be disposed in the projection lens 140 of FIG. 1A or FIG. 1C. FIG. 4A is a top view of the three-axis actuator device 400 according to an embodiment of the disclosure. FIG. 4B is a schematic view of a pixel 491 of the actuator device 400 corresponding to FIG. 4A. FIG. 4C is a schematic view of driving signals 461, 462, and 463 of the actuator device 400 corresponding to FIG. 4A. The driving signal 461 (or the driving signals 462 and 463) is an analog signal or a digital signal, for example. Referring to FIG. 1A to FIG. 1C, FIG. 4A, FIG. 4B, and FIG. 4C, the actuator device 400 may include a base 410, a frame body 420, an optical element 430, and a controller 40 (as shown in FIG. 1A to FIG. 1C). The frame body 420 may be disposed in the base 410, and the optical element 430 may be disposed in the frame body 420. The frame body 420 may include a moving frame 421, a moving frame 422, and a moving frame 423. The moving frame 421 (e.g., the third moving frame) may be disposed in the base 410 and connected to the base 410 through a rotating shaft 441. The moving frame 422 (e.g., the second moving frame) can be disposed in the moving frame 421 and connected to the moving frame 421 through a rotating shaft 442. The moving frame 423 (e.g., the first moving frame) can be disposed in the moving frame 422 and connected to the moving frame 422 through a rotating shaft 443. The optical element 430 can be disposed in the moving frame 423.

The actuator device 400 may further include at least one driving assembly disposed between the base 410 and the frame body 420. The at least one driving assembly is a voice coil motor or a piezoelectric material, for example, and the disclosure is not limited thereto. The controller 40 (as shown in FIG. 1A to FIG. 1C) can be coupled to the at least one driving assembly and used to control the at least one driving assembly to drive the frame body 420 by a signal so that the optical element 430 reciprocally swings relative to the base 410 based on a moving shaft 41, a moving shaft 42, or a moving shaft 43. In the embodiment, the moving shaft 42 may be parallel to the X-axis direction, the moving shaft 43 may be parallel to the Y-axis direction, and the moving shaft 41 may be parallel to the W direction. The W direction can be parallel to the angular bisector of the X axis and the Y axis (or the angular bisector of the negative X-axis direction and the Y-axis direction). In other words, the moving shaft 42 may be perpendicular to the moving shaft 43, and the moving shaft 41 (e.g., the third moving shaft) may extend along the angular bisector of the moving shaft 42 (e.g., the second moving shaft) and the moving shaft 43 (e.g., the first moving shaft).

Specifically, the at least one driving assembly may include a driving assembly 451 (e.g., the third driving assembly) disposed between the base 410 and the moving frame 421. The controller 40 can control the driving assembly 451 to drive the moving frame 421 by the driving signal 461 (e.g., the third driving signal) so that the optical element 430 reciprocally swings relative to the base 410 based on the moving shaft 41. When the optical element 430 reciprocally swings based on the moving shaft 41, the image beam passing through the optical element 430 can be transmitted to a virtual plane 490 to form a light spot moving on the virtual plane 490, and the movement trajectory of the light spot is similar to the movement trajectory of the light spot in the virtual plane 230 of FIG. 2B. The number of the driving assembly 451 can be 1, 2, or N (N is any positive integer). When the number of the driving assembly 451 is two, two driving assemblies 451 can be respectively disposed on opposite sides of the moving shaft 41.

Moreover, the at least one driving assembly may further include a driving assembly 452 (e.g., the second driving assembly) disposed between the moving frame 421 and the moving frame 422. The controller 40 can control the driving assembly 452 to drive the moving frame 422 by the driving signal 462 (e.g., the second driving signal) so that the optical element 430 reciprocally swings relative to the base 410 based on the moving shaft 42. Moreover, the at least one driving assembly may further include a driving assembly 453 (e.g., the first driving assembly) disposed between the moving frame 422 and the moving frame 423. The controller 40 can control the driving assembly 453 to drive the moving frame 423 by the driving signal 463 (e.g., the first driving signal) so that the optical element 430 reciprocally swings relative to the base 410 based on the moving shaft 43. When the optical element 430 reciprocally swings based on the moving shaft 42 and the moving shaft 43, the image beam passing through the optical element 430 can be transmitted to the virtual plane 490 to form a light spot moving on the virtual plane 490, and the movement trajectory of the light spot is similar to the movement trajectory of the light spot in the virtual plane 330 of FIG. 3B. When the optical element 430 reciprocally swings based on the moving shaft 41, the moving shaft 42, and the moving shaft 43, the movement trajectory of the light spot in the virtual plane 490 is like superimposing the movement trajectory of the light spot in the virtual plane 230 and the movement trajectory of the light spot in the virtual plane 330. The image beam passing through the optical element 430 may form a light spot that moves in the order of position 1 to position 8 on the virtual plane 490, and thereby the moving light spot forms the pixel 491.

In an embodiment, the driving assembly 452 may be disposed on the moving shaft 43. The number of the driving assembly 452 can be 1, 2, or N (N is any positive integer). When the number of the driving assembly 452 is two, two driving assemblies 452 can be respectively disposed on opposite sides of the moving frame 422. In an embodiment, the driving assembly 453 may be disposed on the moving shaft 42. The number of the driving assembly 453 can be 1, 2, or N (N is any positive integer). When the number of the driving assembly 453 is two, two driving assemblies 453 can be respectively disposed on opposite sides of the moving frame 423.

The frequencies (e.g., the first frequency) of the driving signal 462 and the driving signal 463 may be the same, and the phase difference between the driving signal 462 and the driving signal 463 may not be zero. For example, the phase difference between the driving signal 462 and the driving signal 463 may be 90 degrees. The frequency of the driving signal 462 (or the driving signal 463) may be different from the frequency of the driving signal 461 (e.g., the second frequency). The frequency of the driving signal 462 (or the driving signal 463) may be an integer multiple of the frequency of the driving signal 461. As shown in FIG. 4C, the frequency of the driving signal 462 (or the driving signal 463) may be two times the frequency of the driving signal 461.

A time interval 465 may be a period in which the pixel 491 is generated. Taking time interval 465 for example, at time t1, the driving signal 461 that changes from a low potential to a high potential can drive the moving frame 421 so that the optical element 430 swings based on the positive direction of the moving shaft 41 (which can be regarded as swinging clockwise about the moving shaft 41). When the optical element 430 swings based on the positive direction of the moving shaft 41, the light spot formed by the image beam on the virtual plane 490 can move along the radial direction of an axis 492 toward the negative X-axis direction and the negative Y-axis direction, the axis 492 is the projection of the moving shaft 41 on the virtual plane 490, and the axis 492 may be parallel to the W direction. The driving signal 462 that changes from a high potential to a low potential can drive the moving frame 422 so that the optical element 430 swings based on the negative direction of the moving shaft 42 (which can be regarded as swinging counterclockwise about the moving shaft 42). When the optical element 430 swings based on the negative direction of the moving shaft 42, the light spot formed by the image beam on the virtual plane 490 can move along the radial direction of an axis 472 toward the Y-axis direction. The axis 472 may be an axis relative to the moving shaft 42 on the virtual plane 490 when the optical element 430 swings based on the positive direction of the moving shaft 41. The driving signal 463 maintained at a high potential may not drive the moving frame 423 so that the optical element 430 does not swing based on the moving shaft 43. Accordingly, the light spot formed by the image beam on the virtual plane 490 may not move along the radial direction of an axis 473. The axis 473 may be an axis relative to the moving shaft 43 on the virtual plane 490 when the optical element 430 swings based on the positive direction of the moving shaft 41. Based on the above, at time t1, the light spot formed by the image beam on the virtual plane 490 can move and stay at position 1.

At time t2, the driving signal 461 is maintained at a high potential, so the driving signal 461 may not drive the moving frame 421 so that the optical element 430 does not swing about the moving shaft 41. Accordingly, the light spot formed by the image beam on the virtual plane 490 may not move along the radial direction of the axis 492. The driving signal 462 is maintained at a low potential, so the driving signal 462 may not drive the moving frame 422 so that the optical element 430 does not swing about the moving shaft 42. Accordingly, the light spot formed by the image beam on the virtual plane 490 may not move along the radial direction of the axis 472. The driving signal 463 that changes from a high potential to a low potential can drive the moving frame 423 so that the optical element 430 swings based on the negative direction of the moving shaft 43 (which can be regarded as swinging counterclockwise about the moving shaft 43). When the optical element 430 swings based on the negative direction of the moving shaft 43, the light spot formed by the image beam on the virtual plane 490 can move along the radial direction of the axis 473 toward the X-axis direction. Based on the above, at time t2, the light spot formed by the image beam on the virtual plane 490 can move and stay at position 2.

At time t3, the driving signal 461 is maintained at a high potential, so the driving signal 461 may not drive the moving frame 421 so that the optical element 430 does not swing about the moving shaft 41. Accordingly, the light spot formed by the image beam on the virtual plane 490 may not move along the radial direction of the axis 492. The driving signal 462 that changes from a low potential to a high potential may drive the moving frame 422 so that the optical element 430 swings based on the positive direction of the moving shaft 42. When the optical element 430 swings based on the positive direction of the moving shaft 42, the light spot formed by the image beam on the virtual plane 490 can move along the radial direction of the axis 472 toward the negative Y-axis direction. The driving signal 463 is maintained at a low potential, so the driving signal 463 may not drive the moving frame 423 so that the optical element 430 does not swing about the moving shaft 43. Accordingly, the light spot formed by the image beam on the virtual plane 490 may not move along the radial direction of the axis 473. Based on the above, at time t3, the light spot formed by the image beam on the virtual plane 490 can move and stay at position 3.

At time t4, the driving signal 461 is maintained at a high potential, so the driving signal 461 may not drive the moving frame 421 so that the optical element 430 does not swing about the moving shaft 41. Accordingly, the light spot formed by the image beam on the virtual plane 490 may not move along the radial direction of the axis 492. The driving signal 462 is maintained at a high potential, so the driving signal 462 may not drive the moving frame 422 so that the optical element 430 does not swing about the moving shaft 42. Accordingly, the light spot formed by the image beam on the virtual plane 490 may not move along the radial direction of the axis 472. The driving signal 463 that changes from a low potential to a high potential may drive the moving frame 423 so that the optical element 430 swings based on the positive direction of the moving shaft 43. When the optical element 430 swings based on the positive direction of the moving shaft 43, the light spot formed by the image beam on the virtual plane 490 can move along the radial direction of the axis 473 toward the negative X-axis direction. Based on the above, at time t4, the light spot formed by the image beam on the virtual plane 490 can move and stay at position 4.

At time t5, the driving signal 461 that changes from a high potential to a low potential may drive the moving frame 421 so that the optical element 430 swings based on the negative direction of the moving shaft 41. When the optical element 430 swings based on the negative direction of the moving shaft 41, the light spot formed by the image beam on the virtual plane 490 can move toward the X-axis direction and Y-axis direction along the radial direction of the axis 492. The driving signal 462 that changes from a high potential to a low potential may drive the moving frame 422 so that the optical element 430 swings based on the negative direction of the moving shaft 42. When the optical element 430 swings based on the negative direction of the moving shaft 42, the light spot formed by the image beam on the virtual plane 490 can move along the radial direction of the axis 482 toward the Y-axis direction. The axis 482 may be an axis relative to the moving shaft 42 on the virtual plane 490 when the optical element 430 swings based on the negative direction of the moving shaft 41. The driving signal 463 is maintained at a high potential, so the driving signal 463 may not drive the moving frame 423 so that the optical element 430 does not swing about the moving shaft 43. Accordingly, the light spot formed by the image beam on the virtual plane 490 may not move along the radial direction of the axis 483. The axis 483 may be an axis relative to the moving shaft 43 on the virtual plane 490 when the optical element 430 swings based on the negative direction of the moving shaft 41. Based on the above, at time t5, the light spot formed by the image beam on the virtual plane 490 can move and stay at position 5.

At time t6, the driving signal 461 is maintained at a low potential, so the driving signal 461 may not drive the moving frame 421 so that the optical element 430 does not swing about the moving shaft 41. Accordingly, the light spot formed by the image beam on the virtual plane 490 may not move along the radial direction of the axis 492. The driving signal 462 is maintained at a low potential, so the driving signal 462 may not drive the moving frame 422 so that the optical element 430 does not swing about the moving shaft 42. Accordingly, the light spot formed by the image beam on the virtual plane 490 may not move along the radial direction of the axis 482. The driving signal 463 that changes from a high potential to a low potential may drive the moving frame 423 so that the optical element 430 swings based on the negative direction of the moving shaft 43. When the optical element 430 swings based on the negative direction of the moving shaft 43, the light spot formed by the image beam on the virtual plane 490 can move toward the positive X-axis direction along the radial direction of the axis 483. Based on the above, at time t6, the light spot formed by the image beam on the virtual plane 490 can move and stay at position 6.

At time t7, the driving signal 461 is maintained at a low potential, so the driving signal 461 may not drive the moving frame 421 so that the optical element 430 does not swing about the moving shaft 41. Accordingly, the light spot formed by the image beam on the virtual plane 490 may not move along the radial direction of the axis 492. The driving signal 462 that changes from a low potential to a high potential may drive the moving frame 422 so that the optical element 430 swings based on the positive direction of the moving shaft 42. When the optical element 430 swings based on the positive direction of the moving shaft 42, the light spot formed by the image beam on the virtual plane 490 can move along the radial direction of the axis 482 toward the negative Y-axis direction. The driving signal 463 is maintained at a low potential, so the driving signal 463 may not drive the moving frame 423 so that the optical element 430 does not swing about the moving shaft 43. Accordingly, the light spot formed by the image beam on the virtual plane 490 may not move along the radial direction of the axis 483. Based on the above, at time t7, the light spot formed by the image beam on the virtual plane 490 can move and stay at position 7.

At time t8, the driving signal 461 is maintained at a low potential, so the driving signal 461 may not drive the moving frame 421 so that the optical element 430 does not swing about the moving shaft 41. Accordingly, the light spot formed by the image beam on the virtual plane 490 may not move along the radial direction of the axis 492. The driving signal 462 is maintained at a high potential, so the driving signal 462 may not drive the moving frame 422 so that the optical element 430 does not swing about the moving shaft 42. Accordingly, the light spot formed by the image beam on the virtual plane 490 may not move along the radial direction of the axis 482. The driving signal 463 that changes from a low potential to a high potential may drive the moving frame 423 so that the optical element 430 swings based on the positive direction of the moving shaft 43. When the optical element 430 swings based on the positive direction of the moving shaft 43, the light spot formed by the image beam on the virtual plane 490 can move toward the negative X-axis direction along the radial direction of the axis 483. Based on the above, at time t8, the light spot formed by the image beam on the virtual plane 490 can move and stay at position 8.

At time t9, the driving signal 461 that changes from a low potential to a high potential may drive the moving frame 421 so that the optical element 430 swings based on the positive direction of the moving shaft 41. When the optical element 430 swings based on the positive direction of the moving shaft 41, the light spot formed by the image beam on the virtual plane 490 can move along the radial direction of the axis 492 toward the negative X-axis direction and negative Y-axis direction. The driving signal 462 that changes from a high potential to a low potential may drive the moving frame 422 so that the optical element 430 swings based on the negative direction of the moving shaft 42. When the optical element 430 swings based on the negative direction of the moving shaft 42, the light spot formed by the image beam on the virtual plane 490 can move along the radial direction of the axis 472 toward the Y-axis direction. The driving signal 463 is maintained at a high potential, so the driving signal 463 may not drive the moving frame 423 so that the optical element 430 does not swing about the moving shaft 43. Accordingly, the light spot formed by the image beam on the virtual plane 490 may not move along the radial direction of the axis 473. Based on the above, at time t9, the light spot formed by the image beam on the virtual plane 490 can return to position 1.

Figure 5A:
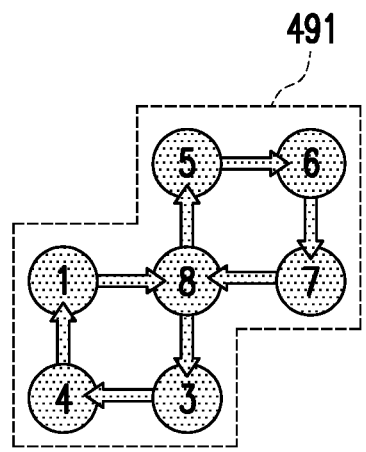
FIG. 5A is a schematic view of a pixel according to an embodiment of the disclosure.

The controller 40 (as shown in FIG. 1A to FIG. 1C) can adjust the swing angle of the frame body 420 when the frame body 420 swings through at least one driving assembly, and thereby the effect of changing the appearance of the pixel 491 is achieved. FIG. 5A is a schematic view of the pixel 491 according to an embodiment of the disclosure. The light spot formed by the image beam on the virtual plane 490 can move in the order of position 1 to position 8, and thereby the pixel 491 is formed. Since position 2 overlaps with position 8, position 2 is not shown in FIG. 5A. Referring to the pixel in FIG. 5A mainly (refer to FIG. 4A and FIG. 4B for other reference numerals), in the embodiment, the swing angle corresponding to the moving shaft 41 can be $\sqrt{2}$ times the swing angle corresponding to the moving shaft 42, and the swing angle corresponding to the moving shaft 42 may be the same as the swing angle corresponding to the moving shaft 43. Therefore, when the image beam is transmitted to the virtual plane 490 through the reciprocally swinging optical element 430 to form a light spot moving on the virtual plane 490, the displacement (e.g., the third displacement) of the light spot in the radial direction (e.g., the third radial direction) of the axis 492 corresponding to the moving shaft 41 (e.g., the third moving shaft) can be $\sqrt{2}$ times the displacement (e.g., the second displacement) of the light spot in the radial direction (e.g., the second radial direction) of the axis 472 (or the axis 482) corresponding to the moving shaft 42 (e.g., the second moving shaft), and the displacement (e.g., the third displacement) of the light spot in the radial direction (e.g., the third radial direction) of the axis 492 corresponding to the moving shaft 41 (e.g., the third moving shaft) can be $\sqrt{2}$ times the displacement (e.g., the first displacement) of the light spot in the radial direction (e.g., the first radial direction) of the axis 473 (or the axis 483) corresponding to the moving shaft 43 (e.g., the first moving shaft).

Figure 6A:
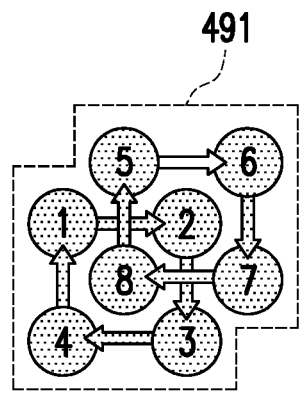
FIG. 6A is a schematic view of a pixel according to another embodiment of the disclosure.

FIG. 6A is a schematic view of the pixel 491 according to another embodiment of the disclosure. The light spot formed by the image beam on the virtual plane 490 can move in the order of position 1 to position 8, and thereby the pixel 491 is formed. Referring to the pixel in FIG. 6A mainly (refer to FIG. 4A and FIG. 4B for other reference numerals), in the embodiment, the swing angle corresponding to the moving shaft 41 can be $\sqrt{2}/2$ times the swing angle corresponding to the moving shaft 42, and the swing angle corresponding to the moving shaft 42 may be the same as the swing angle corresponding to the moving shaft 43. Therefore, when the image beam is transmitted to the virtual plane 490 through the reciprocally swinging optical element 430 to form a light spot moving on the virtual plane 490, the displacement (e.g., the third displacement) of the light spot in the radial direction (e.g., the third radial direction) of the axis 492 corresponding to the moving shaft 41 (e.g., the third moving shaft) can be $\sqrt{2}/2$ times the displacement (e.g., the second displacement) of the light spot in the radial direction (e.g., the second radial direction) of the axis 472 (or the axis 482) corresponding to the moving shaft 42 (e.g., the second moving shaft), and the displacement (e.g., the third displacement) of the light spot in the radial direction (e.g., the third radial direction) of the axis 492 corresponding to the moving shaft 41 (e.g., the third moving shaft) can be $\sqrt{2}/2$ times the displacement (e.g., the first displacement) of the light spot in the radial direction (e.g., the first radial direction) of the axis 473 (or the axis 483) corresponding to the moving shaft 43 (e.g., the first moving shaft).

Figure 7A:
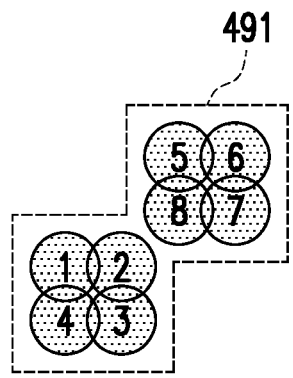
FIG. 7A is a schematic view of a pixel according to yet another embodiment of the disclosure.

FIG. 7A is a schematic view of the pixel 491 according to yet another embodiment of the disclosure. The light spot formed by the image beam on the virtual plane 490 can move in the order of position 1 to position 8, and thereby the pixel 491 is formed. Referring to the pixel in FIG. 7A mainly (refer to FIG. 4A and FIG. 4B for other reference numerals), in the embodiment, the swing angle corresponding to the moving shaft 41 can be $2\sqrt{2}$ times the swing angle corresponding to the moving shaft 42, and the swing angle corresponding to the moving shaft 42 may be the same as the swing angle corresponding to the moving shaft 43. Therefore, when the image beam is transmitted to the virtual plane 490 through the reciprocally swinging optical element 430 to form a light spot moving on the virtual plane 490, the displacement (e.g., the third displacement) of the light spot in the radial direction (e.g., the third radial direction) of the axis 492 corresponding to the moving shaft 41 (e.g., the third moving shaft) can be $2\sqrt{2}$ times the displacement (e.g., the second displacement) of the light spot in the radial direction (e.g., the second radial direction) of the axis 472 (or the axis 482) corresponding to the moving shaft 42 (e.g., the second moving shaft), and the displacement (e.g., the third displacement) of the light spot in the radial direction (e.g., the third radial direction) of the axis 492 corresponding to the moving shaft 41 (e.g., the third moving shaft) can be $2\sqrt{2}$ times the displacement (e.g., the first displacement) of the light spot in the radial direction (e.g., the first radial direction) of the axis 473 (or the axis 483) corresponding to the moving shaft 43 (e.g., the first moving shaft).

Figure 5B:
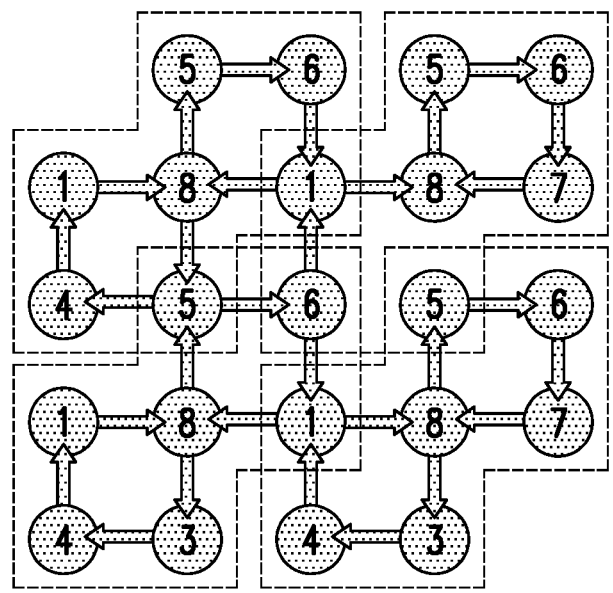
FIG. 5B is a layout view of multiple pixels corresponding to FIG. 5A.
Figure 6B:
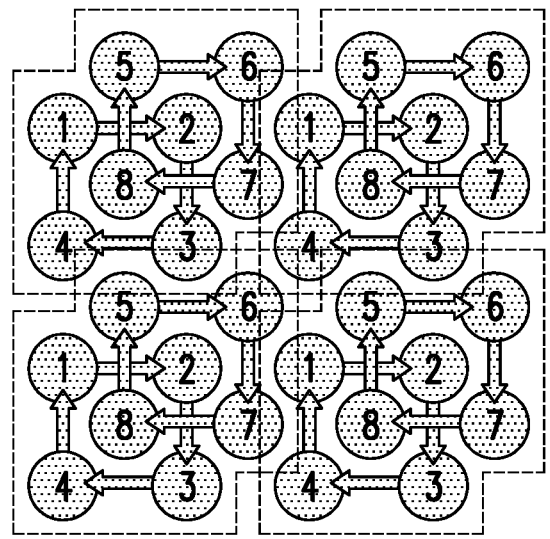
FIG. 6B is a layout view of multiple pixels corresponding to FIG. 6A.
Figure 7B:
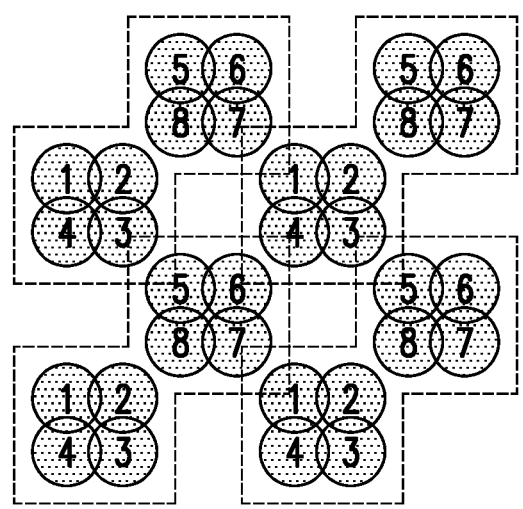
FIG. 7B is a layout view of multiple pixels corresponding to FIG. 7A.

FIG. 5B is a layout view of multiple pixels 491 corresponding to FIG. 5A. FIG. 6B is a layout view of multiple pixels 491 corresponding to FIG. 6A. FIG. 7B is a layout view of multiple pixels 491 corresponding to FIG. 7A. According to FIG. 5B, FIG. 6B, and FIG. 7B, the layout generated by multiple pixels 491 as shown in FIG. 6A may have a larger pixel density.

Figure 8A:
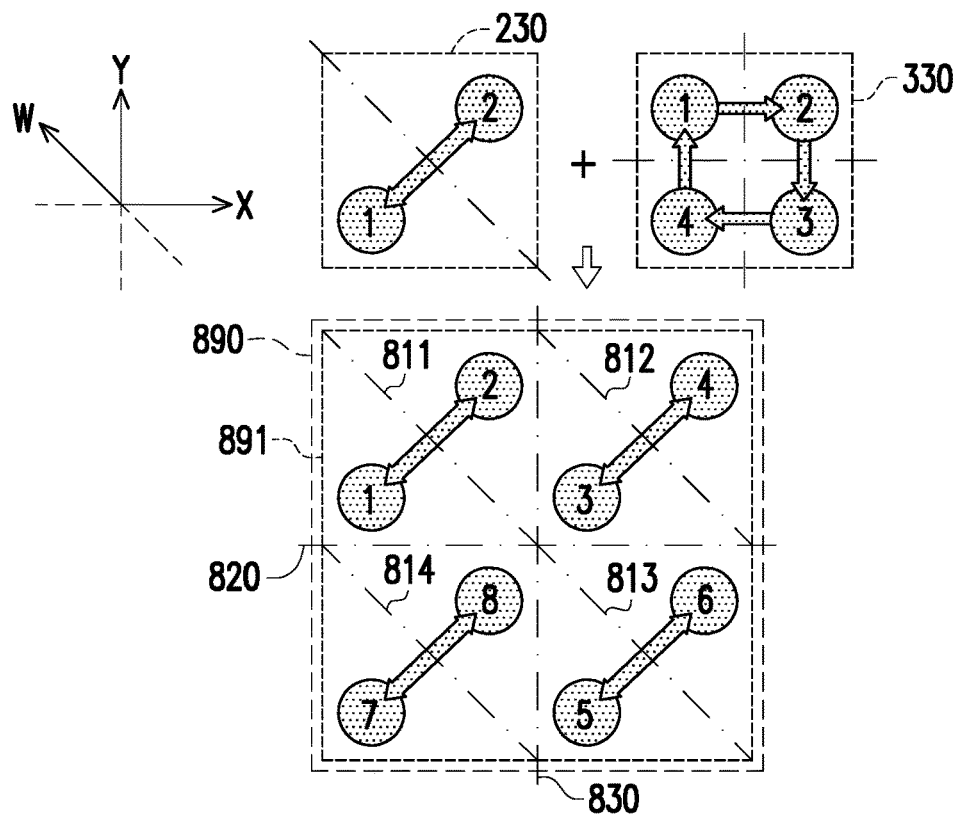
FIG. 8A is a schematic view of the pixels of the actuator device corresponding to FIG. 4A.
Figure 8B:
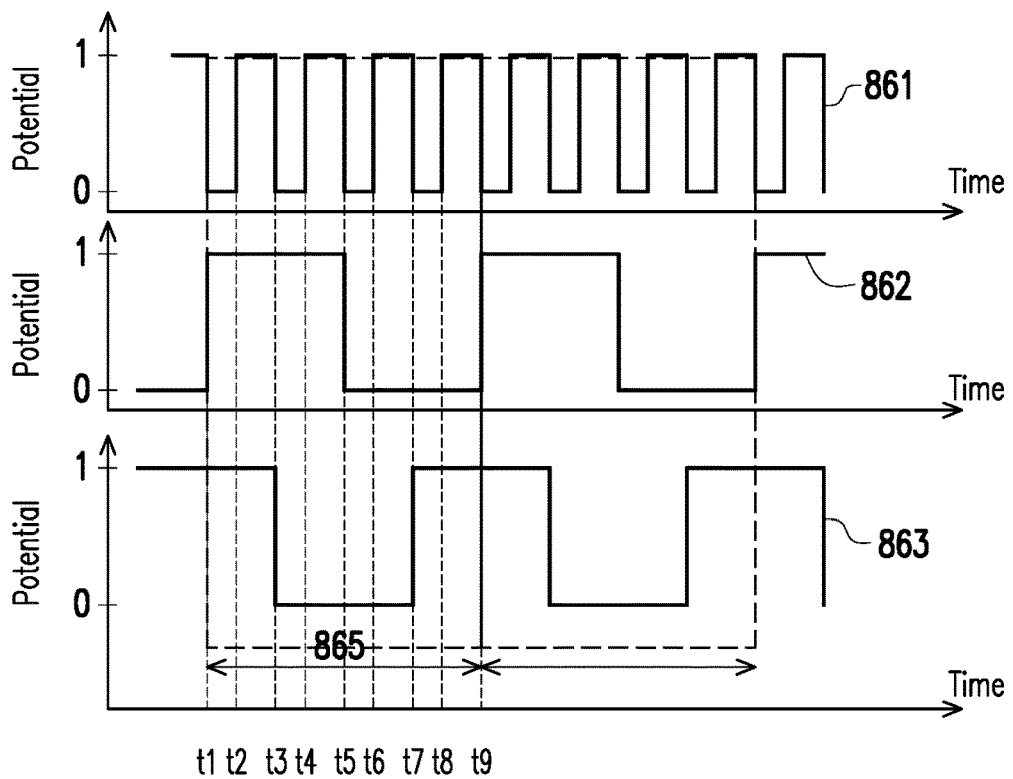
FIG. 8B is a schematic view of driving signals of the actuator device corresponding to FIG. 4A.

FIG. 8A is a schematic view of a pixel 891 of the actuator device 400 corresponding to FIG. 4A. FIG. 8B is a schematic view of driving signals 861, 862, and 863 of the actuator device 400 corresponding to FIG. 4A. The driving signal 861 (or the driving signals 862 and 863) is an analog signal or a digital signal, for example. Referring to FIG. 1A to FIG. 1C, FIG. 4A, FIG. 8A, and FIG. 8B, in the embodiment, the driving signal 861 (e.g., the third driving signal) can be used to control the driving assembly 451 to drive the moving frame 421 so that the optical element 430 reciprocally swings based on the moving shaft 41. The driving signal 862 (e.g., the second driving signal) can be used to control the driving assembly 452 to drive the moving frame 422 so that the optical element 430 reciprocally swings based on the moving shaft 42. The driving signal 863 (e.g., the first driving signal) can be used to control the driving assembly 453 to drive the moving frame 423 so that the optical element 430 reciprocally swings based on the moving shaft 43. The frequencies (e.g., the first frequency) of the driving signal 862 and the driving signal 863 may be the same, and the phase difference between the driving signal 862 and the driving signal 863 may not be zero. For example, the phase difference between the driving signal 862 and the driving signal 863 may be 90 degrees. The frequency (e.g., the second frequency) of the driving signal 861 may be different from the frequency of the driving signal 862 (or the driving signal 863). The frequency of the driving signal 861 may be an integer multiple of the frequency of the driving signal 862 (or the driving signal 863). As shown in FIG. 8B, the frequency of the driving signal 861 may be four times the frequency of the driving signal 862 (or the driving signal 863).

A time interval 865 may be a period in which the pixel 891 is generated. Taking the time interval 865 for example, at time t1, the driving signal 862 that changes from a low potential to a high potential can drive the moving frame 422 so that the optical element 430 swings based on the positive direction of the moving shaft 42 (which can be regarded as swinging clockwise about the moving shaft 42). When the optical element 430 swings based on the positive direction of the moving shaft 42, the light spot formed by the image beam on a virtual plane 890 can move along the radial direction of the axis 820 toward the Y-axis direction, the axis 820 is the projection of the moving shaft 42 on the virtual plane 890, and the axis 820 may be parallel to the X-axis direction. The driving signal 863 maintained at a high potential may not drive the moving frame 423 so that the optical element 430 does not swing based on the moving shaft 43. Accordingly, the light spot formed by the image beam on the virtual plane 890 may not move along the radial direction of the axis 830, the axis 830 is the projection of the moving shaft 43 on the virtual plane 890, and the axis 830 may be parallel to the Y-axis direction. The driving signal 861 that changes from a high potential to a low potential can drive the moving frame 421 so that the optical element 430 swings based on the negative direction of the moving shaft 41 (which can be regarded as swinging counterclockwise about the moving shaft 41). When the optical element 430 swings based on the negative direction of the moving shaft 41, the light spot formed by the image beam on the virtual plane 890 can move along the radial direction of the axis 811 toward the negative X-axis direction and negative Y-axis direction. The axis 811 may be an axis relative to the moving shaft 41 on the virtual plane 890 when the optical element 430 swings based on the positive directions of the moving shaft 42 and the moving shaft 43. Based on the above, at time t1, the light spot formed by the image beam on the virtual plane 890 can move and stay at position 1.

At the time interval 865, at time t2, the driving signal 862 is maintained at a high potential, so the driving signal 862 may not drive the moving frame 422 so that the optical element 430 does not swing about the moving shaft 42. Accordingly, the light spot formed by the image beam on the virtual plane 890 may not move along the radial direction of the axis 820. The driving signal 863 is maintained at a high potential, so the driving signal 863 may not drive the moving frame 423 so that the optical element 430 does not swing about the moving shaft 43. Accordingly, the light spot formed by the image beam on the virtual plane 890 may not move along the radial direction of the axis 830. The driving signal 861 that changes from a low potential to a high potential may drive the moving frame 421 so that the optical element 430 swings based on the positive direction of the moving shaft 41. When the optical element 430 swings based on the positive direction of the moving shaft 41, the light spot formed by the image beam on the virtual plane 890 can move along the radial direction of the axis 811 toward the X-axis direction and Y-axis direction. Based on the above, at time t2, the light spot formed by the image beam on the virtual plane 890 can move and stay at position 2.

At time t3, the driving signal 862 is maintained at a high potential, so the driving signal 862 may not drive the moving frame 422 so that the optical element 430 does not swing about the moving shaft 42. Accordingly, the light spot formed by the image beam on the virtual plane 890 may not move along the radial direction of the axis 820. The driving signal 863 that changes from a high potential to a low potential can drive the moving frame 423 so that the optical element 430 swings based on the negative direction of the moving shaft 43 (which can be regarded as swinging counterclockwise about the moving shaft 43). When the optical element 430 swings based on the negative direction of the moving shaft 43, the light spot formed by the image beam on the virtual plane 890 can move along the radial direction of the axis 830 toward the X-axis direction. The driving signal 861 that changes from a high potential to a low potential may drive the moving frame 421 so that the optical element 430 swings based on the negative direction of the moving shaft 41. When the optical element 430 swings based on the negative direction of the moving shaft 41, the light spot formed by the image beam on the virtual plane 890 can move along the radial direction of the axis 812 toward the negative X-axis direction and negative Y-axis direction. The axis 812 may be an axis relative to the moving shaft 41 on the virtual plane 890 when the optical element 430 swings based on the positive direction of the moving shaft 42 and negative direction of the moving shaft 43. Based on the above, at time t3, the light spot formed by the image beam on the virtual plane 890 can move and stay at position 3.

At time t4, the driving signal 862 is maintained at a high potential, so the driving signal 862 may not drive the moving frame 422 so that the optical element 430 does not swing about the moving shaft 42. Accordingly, the light spot formed by the image beam on the virtual plane 890 may not move along the radial direction of the axis 820. The driving signal 863 is maintained at a low potential, so the driving signal 863 may not drive the moving frame 423 so that the optical element 430 does not swing about the moving shaft 43. Accordingly, the light spot formed by the image beam on the virtual plane 890 may not move along the radial direction of the axis 830. The driving signal 861 that changes from a low potential to a high potential may drive the moving frame 421 so that the optical element 430 swings based on the positive direction of the moving shaft 41. When the optical element 430 swings based on the positive direction of the moving shaft 41, the light spot formed by the image beam on the virtual plane 890 can move along the radial direction of the axis 812 toward the X-axis direction and Y-axis direction. Based on the above, at time t4, the light spot formed by the image beam on the virtual plane 890 can move and stay at position 4.

At time t5, the driving signal 862 that changes from a high potential to a low potential may drive the moving frame 422 so that the optical element 430 swings based on the negative direction of the moving shaft 42. When the optical element 430 swings based on the negative direction of the moving shaft 42, the light spot formed by the image beam on the virtual plane 890 can move along the radial direction of the axis 820 toward the negative Y-axis direction. The driving signal 863 is maintained at a low potential, so the driving signal 863 may not drive the moving frame 423 so that the optical element 430 does not swing about the moving shaft 43. Accordingly, the light spot formed by the image beam on the virtual plane 890 may not move along the radial direction of the axis 830. The driving signal 861 that changes from a high potential to a low potential may drive the moving frame 421 so that the optical element 430 swings based on the negative direction of the moving shaft 41. When the optical element 430 swings based on the negative direction of the moving shaft 41, the light spot formed by the image beam on the virtual plane 890 can move along the radial direction of the axis 813 toward the negative X-axis direction and negative Y-axis direction. The axis 813 may be a projection relative to the moving shaft 41 on the virtual plane 890 when the optical element 430 swings based on the negative directions of the moving shaft 42 and the moving shaft 43. Based on the above, at time t5, the light spot formed by the image beam on the virtual plane 890 can move and stay at position 5.

At time t6, the driving signal 862 is maintained at a low potential, so the driving signal 862 may not drive the moving frame 422 so that the optical element 430 does not swing about the moving shaft 42. Accordingly, the light spot formed by the image beam on the virtual plane 890 may not move along the radial direction of the axis 820. The driving signal 863 is maintained at a low potential, so the driving signal 863 may not drive the moving frame 423 so that the optical element 430 does not swing about the moving shaft 43. Accordingly, the light spot formed by the image beam on the virtual plane 890 may not move along the radial direction of the axis 830. The driving signal 861 that changes from a low potential to a high potential may drive the moving frame 421 so that the optical element 430 swings based on the positive direction of the moving shaft 41. When the optical element 430 swings based on the positive direction of the moving shaft 41, the light spot formed by the image beam on the virtual plane 890 can move along the radial direction of the axis 813 toward the X-axis direction and Y-axis direction. Based on the above, at time t6, the light spot formed by the image beam on the virtual plane 890 can move and stay at position 6.

At time t7, the driving signal 862 is maintained at a low potential, so the driving signal 862 may not drive the moving frame 422 so that the optical element 430 does not swing about the moving shaft 42. Accordingly, the light spot formed by the image beam on the virtual plane 890 may not move along the radial direction of the axis 820. The driving signal 863 that changes from a low potential to a high potential may drive the moving frame 423 so that the optical element 430 swings based on the positive direction of the moving shaft 43. When the optical element 430 swings based on the positive direction of the moving shaft 43, the light spot formed by the image beam on the virtual plane 890 can move along the radial direction of the axis 830 toward the negative X-axis direction. The driving signal 861 that changes from a high potential to a low potential may drive the moving frame 421 so that the optical element 430 swings based on the negative direction of the moving shaft 41. When the optical element 430 swings based on the negative direction of the moving shaft 41, the light spot formed by the image beam on the virtual plane 890 can move along the radial direction of the axis 814 toward the negative X-axis direction and negative Y-axis direction. The axis 814 may be an axis relative to the moving shaft 41 on the virtual plane 890 when the optical element 430 swings based on the negative direction of the moving shaft 42 and positive direction of the moving shaft 43. Based on the above, at time t7, the light spot formed by the image beam on the virtual plane 890 can move and stay at position 7.

At time t8, the driving signal 862 is maintained at a low potential, so the driving signal 862 may not drive the moving frame 422 so that the optical element 430 does not swing about the moving shaft 42. Accordingly, the light spot formed by the image beam on the virtual plane 890 may not move along the radial direction of the axis 820. The driving signal 863 is maintained at a high potential, so the driving signal 863 may not drive the moving frame 423 so that the optical element 430 does not swing about the moving shaft 43. Accordingly, the light spot formed by the image beam on the virtual plane 890 may not move along the radial direction of the axis 830. The driving signal 861 that changes from a low potential to a high potential may drive the moving frame 421 so that the optical element 430 swings based on the positive direction of the moving shaft 41. When the optical element 430 swings based on the positive direction of the moving shaft 41, the light spot formed by the image beam on the virtual plane 890 can move along the radial direction of the axis 814 toward the X-axis direction and Y-axis direction. Based on the above, at time t8, the light spot formed by the image beam on the virtual plane 890 can move and stay at position 8.

At time t9, the driving signal 862 that changes from a low potential to a high potential may drive the moving frame 422 so that the optical element 430 swings based on the positive direction of the moving shaft 42. When the optical element 430 swings based on the positive direction of the moving shaft 42, the light spot formed by the image beam on the virtual plane 890 can move toward the Y-axis direction along the radial direction of the axis 820. The driving signal 863 is maintained at a low potential, so the driving signal 863 may not drive the moving frame 423 so that the optical element 430 does not swing about the moving shaft 43. Accordingly, the light spot formed by the image beam on the virtual plane 890 may not move along the radial direction of the axis 830. The driving signal 861 that changes from a high potential to a low potential may drive the moving frame 421 so that the optical element 430 swings based on the negative direction of the moving shaft 41. When the optical element 430 swings based on the negative direction of the moving shaft 41, the light spot formed by the image beam on the virtual plane 890 can move along the radial direction of the axis 811 toward the negative X-axis direction and negative Y-axis direction. Based on the above, at time t9, the light spot formed by the image beam on the virtual plane 890 can return to position 1.

Figure 9A:
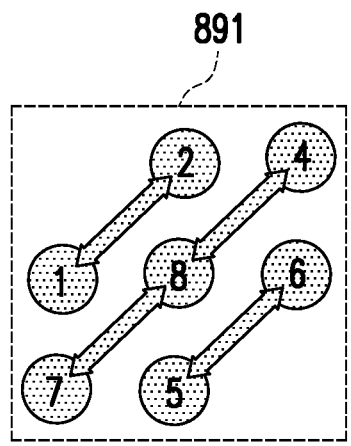
FIG. 9A is a schematic view of a pixel according to an embodiment of the disclosure.

The controller 40 (as shown in FIG. 1A to FIG. 1C) can adjust the swing angle of the frame body 420 when the frame body 420 swings through at least one driving assembly, and thereby the effect of changing the appearance of the pixel 891 is achieved. FIG. 9A is a schematic view of the pixel 891 according to an embodiment of the disclosure. The light spot formed by the image beam on the virtual plane 890 can move in the order of position 1 to position 8, and thereby the pixel 891 is formed. Referring to the pixel in FIG. 9A mainly (refer to FIG. 4A and FIG. 8A for other reference numerals), in the embodiment, the swing angle corresponding to the moving shaft 41 can be $\sqrt{2}$ times the swing angle corresponding to the moving shaft 42, and the swing angle corresponding to the moving shaft 42 may be the same as the swing angle corresponding to the moving shaft 43. Therefore, when the image beam is transmitted to the virtual plane 890 through the reciprocally swinging optical element 430 to form a light spot moving on the virtual plane 890, the displacement (e.g., the third displacement) of the light spot in the radial direction (e.g., the third radial direction) of the axis 811 (or axes 812, 813, or 814) corresponding to the moving shaft 41 (e.g., the third moving shaft) can be $\sqrt{2}$ times the displacement (e.g., the second displacement) of the light spot in the radial direction (e.g., the second radial direction) of the axis 820 corresponding to the moving shaft 42 (e.g., the second moving shaft), and the displacement (e.g., the third displacement) of the light spot in the radial direction (e.g., the third radial direction) of the axis 811 (or axes 812, 813, or 814) corresponding to the moving shaft 41 (e.g., the third moving shaft) can be $\sqrt{2}$ times the displacement (e.g., the first displacement) of the light spot in the radial direction (e.g., the first radial direction) of the axis 830 corresponding to the moving shaft 43 (e.g., the first moving shaft).

Figure 10A:
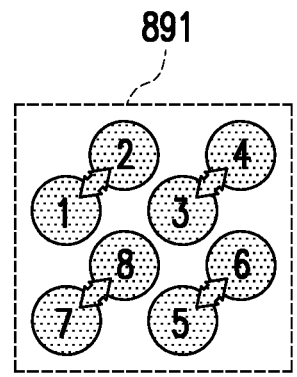
FIG. 10A is a schematic view of a pixel according to another embodiment of the disclosure.

FIG. 10A is a schematic view of the pixel 891 according to another embodiment of the disclosure. The light spot formed by the image beam on the virtual plane 890 can move in the order of position 1 to position 8, and thereby the pixel 891 is formed. Referring to the pixel in FIG. 10A mainly (refer to FIG. 4A and FIG. 8A for other reference numerals), in the embodiment, the swing angle corresponding to the moving shaft 41 can be $\sqrt{2}/2$ times the swing angle corresponding to the moving shaft 42, and the swing angle corresponding to the moving shaft 42 may be the same as the swing angle corresponding to the moving shaft 43. Therefore, when the image beam is transmitted to the virtual plane 890 through the reciprocally swinging optical element 430 to form a light spot moving on the virtual plane 890, the displacement (e.g., the third displacement) of the light spot in the radial direction (e.g., the third radial direction) of the axis 811 (or axes 812, 813, or 814) corresponding to the moving shaft 41 (e.g., the third moving shaft) can be $\sqrt{2}/2$ times the displacement (e.g., the second displacement) of the light spot in the radial direction (e.g., the second radial direction) of the axis 820 corresponding to the moving shaft 42 (e.g., the second moving shaft), and the displacement (e.g., the third displacement) of the light spot in the radial direction (e.g., the third radial direction) of the axis 811 (or axes 812, 813, or 814) corresponding to the moving shaft 41 (e.g., the third moving shaft) can be $\sqrt{2}/2$ times the displacement (e.g., the first displacement) of the light spot in the radial direction (e.g., the first radial direction) of the axis 830 corresponding to the moving shaft 43 (e.g., the first moving shaft).

Figure 11A:
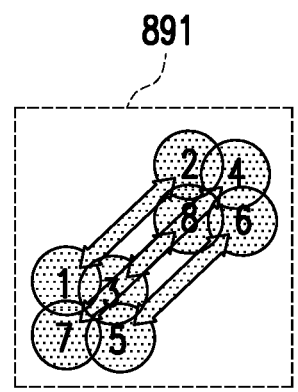
FIG. 11A is a schematic view of a pixel according to still another embodiment of the disclosure.

FIG. 11A is a schematic view of the pixel 891 according to yet another embodiment of the disclosure. The light spot formed by the image beam on the virtual plane 890 can move in the order of position 1 to position 8, and thereby the pixel 891 is formed. Referring to the pixel in FIG. 11A mainly (refer to FIG. 4A and FIG. 8A for other reference numerals), in the embodiment, the swing angle corresponding to the moving shaft 41 can be $2\sqrt{2}$ times the swing angle corresponding to the moving shaft 42, and the swing angle corresponding to the moving shaft 42 may be the same as the swing angle corresponding to the moving shaft 43. Therefore, when the image beam is transmitted to the virtual plane 890 through the reciprocally swinging optical element 430 to form a light spot moving on the virtual plane 890, the displacement (e.g., the third displacement) of the light spot in the radial direction (e.g., the third radial direction) of the axis 811 (or axes 812, 813, or 814) corresponding to the moving shaft 41 (e.g., the third moving shaft) can be $2\sqrt{2}$ times the displacement (e.g., the second displacement) of the light spot in the radial direction (e.g., the second radial direction) of the axis 820 corresponding to the moving shaft 42 (e.g., the second moving shaft), and the displacement (e.g., the third displacement) of the light spot in the radial direction (e.g., the third radial direction) of the axis 811 (or axes 812, 813, or 814) corresponding to the moving shaft 41 (e.g., the third moving shaft) can be $2\sqrt{2}$ times the displacement (e.g., the first displacement) of the light spot in the radial direction (e.g., the first radial direction) of the axis 830 corresponding to the moving shaft 43 (e.g., the first moving shaft).

Figure 9B:
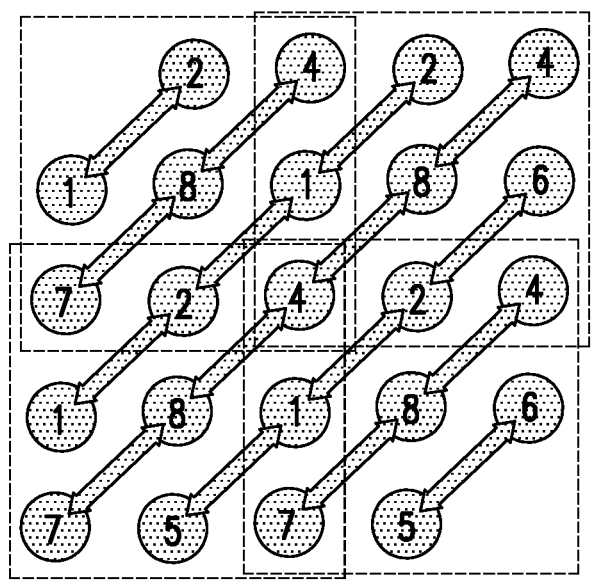
FIG. 9B is a layout view of multiple pixels corresponding to FIG. 9A.
Figure 10B:
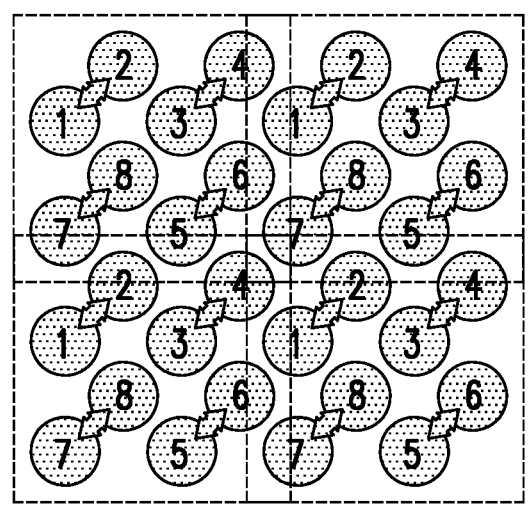
FIG. 10B is a layout view of multiple pixels corresponding to FIG. 10A.
Figure 11B:
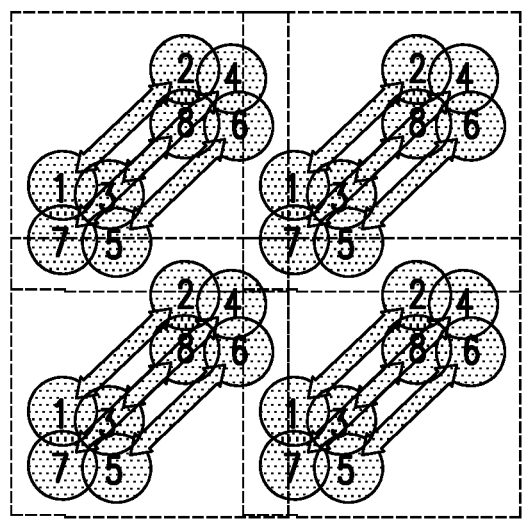
FIG. 11B is a layout view of multiple pixels corresponding to FIG. 11A.

FIG. 9B is a layout view of multiple pixels 891 corresponding to FIG. 9A. FIG. 10B is a layout view of multiple pixels 891 corresponding to FIG. 10A. FIG. 11B is a layout view of multiple pixels 891 corresponding to FIG. 11A. According to FIG. 9B, FIG. 10B, and FIG. 11B, the layout generated by multiple pixels 891 as shown in FIG. 10A may have a larger pixel density.

Figure 12A:
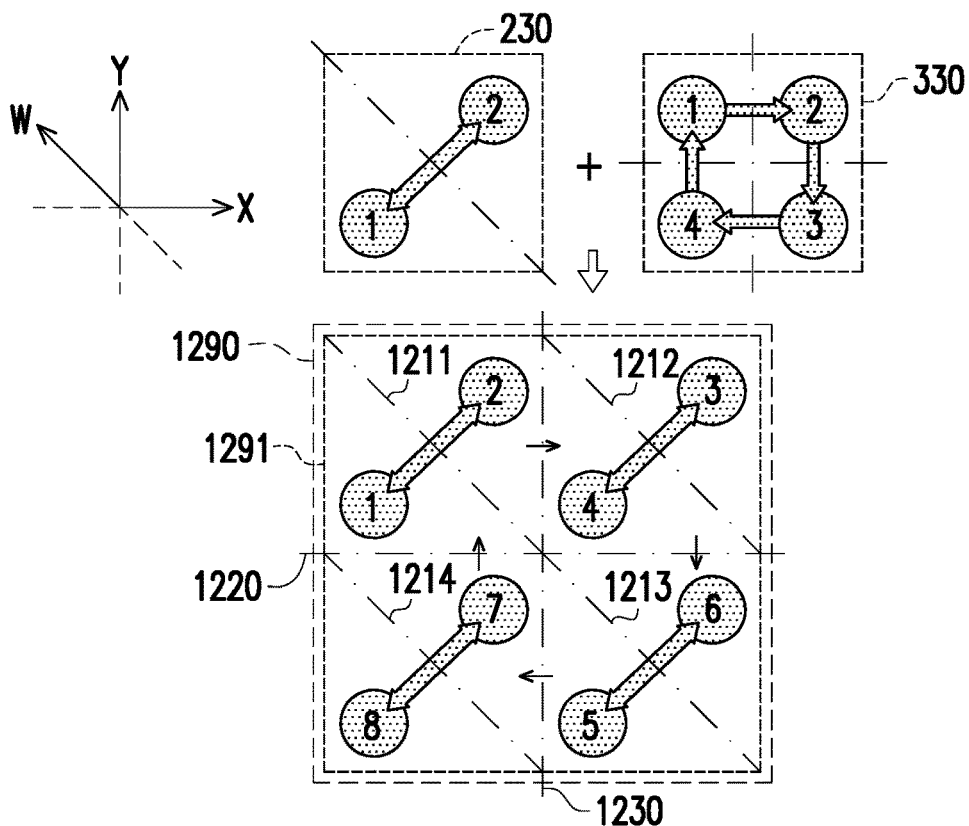
FIG. 12A is a schematic view of the pixels of the actuator device corresponding to FIG. 4A.
Figure 12B:
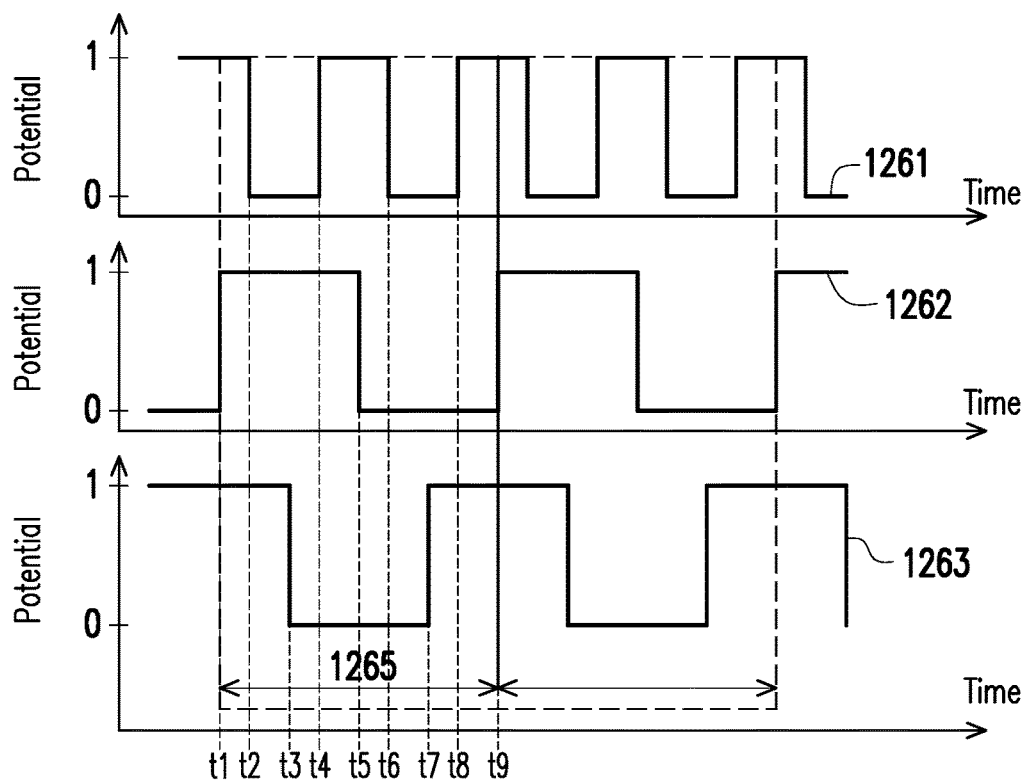
FIG. 12B is a schematic view of driving signals of the actuator device corresponding to FIG. 4A.

FIG. 12A is a schematic view of a pixel 1291 of the actuator device 400 corresponding to FIG. 4A. FIG. 12B is a schematic view of driving signals 1261, 1262, and 1263 of the actuator device 400 corresponding to FIG. 4A. The driving signal 1261 (or the driving signals 1262 and 1263) is an analog signal or a digital signal, for example. Referring to FIG. 1A to FIG. 1C, FIG. 4A, FIG. 12A, and FIG. 12B, in the embodiment, the driving signal 1261 (e.g., the third driving signal) can be used to control the driving assembly 451 to drive the moving frame 421 so that the optical element 430 reciprocally swings based on the moving shaft 41. The driving signal 1262 (e.g., the second driving signal) can be used to control the driving assembly 452 to drive the moving frame 422 so that the optical element 430 reciprocally swings based on the moving shaft 42. The driving signal 1263 (e.g., the first driving signal) can be used to control the driving assembly 453 to drive the moving frame 423 so that the optical element 430 reciprocally swings based on the moving shaft 43. The frequencies (e.g., the first frequency) of the driving signal 1262 and the driving signal 1263 may be the same, and the phase difference between the driving signal 1262 and the driving signal 1263 may not be zero. For example, the phase difference between the driving signal 1262 and the driving signal 1263 may be 90 degrees. The frequency (e.g., the second frequency) of the driving signal 1261 may be different from the frequency of the driving signal 1262 (or the driving signal 1263). The frequency of the driving signal 1261 may be an integer multiple of the frequency of the driving signal 1262 (or the driving signal 1263). As shown in FIG. 12B, the frequency of the driving signal 1261 may be two times the frequency of the driving signal 1262 (or the driving signal 1263).

A time interval 1265 may be a period in which the pixel 1291 is generated. Taking the time interval 1265 for example, at time t1, the driving signal 1262 that changes from a low potential to a high potential can drive the moving frame 422 so that the optical element 430 swings based on the positive direction of the moving shaft 42 (which can be regarded as swinging clockwise about the moving shaft 42). When the optical element 430 swings based on the positive direction of the moving shaft 42, the light spot formed by the image beam on the virtual plane 1290 can move along the radial direction of the axis 1220 toward the Y-axis direction, the axis 1220 is the projection of the moving shaft 42 on the virtual plane 1290, and the axis 1220 may be parallel to the X-axis direction. The driving signal 1263 maintained at a high potential may not drive the moving frame 423 so that the optical element 430 does not swing based on the moving shaft 43. Accordingly, the light spot formed by the image beam on the virtual plane 1290 may not move along the radial direction of the axis 1230, the axis 1230 is the projection of the moving shaft 43 on the virtual plane 1290, and the axis 1230 may be parallel to the Y-axis direction. The driving signal 1261 maintained at a high potential may not drive the moving frame 421 so that the optical element 430 does not swing based on the moving shaft 41. Accordingly, the light spot formed by the image beam on the virtual plane 1290 may not move along the radial direction of the axis 1211. The axis 1211 may be an axis relative to the moving shaft 41 on the virtual plane 1290 when the optical element 430 swings based on the positive directions of the moving shaft 42 and the moving shaft 43. Based on the above, at time t1, the light spot formed by the image beam on the virtual plane 1290 can move and stay at position 1.

At time interval 1265, at time t2, the driving signal 1262 is maintained at a high potential, so the driving signal 1262 may not drive the moving frame 422 so that the optical element 430 does not swing about the moving shaft 42. Accordingly, the light spot formed by the image beam on the virtual plane 1290 may not move along the radial direction of the axis 1220. The driving signal 1263 is maintained at a high potential, so the driving signal 1263 may not drive the moving frame 423 so that the optical element 430 does not swing about the moving shaft 43. Accordingly, the light spot formed by the image beam on the virtual plane 1290 may not move along the radial direction of the axis 1230. The driving signal 1261 that changes from a high potential to a low potential can drive the moving frame 421 so that the optical element 430 swings based on the negative direction of the moving shaft 41 (which can be regarded as swinging counterclockwise about the moving shaft 41). When the optical element 430 swings based on the negative direction of the moving shaft 41, the light spot formed by the image beam on the virtual plane 1290 can move along the radial direction of the axis 1211 toward the X-axis direction and Y-axis direction. Based on the above, at time t2, the light spot formed by the image beam on the virtual plane 1290 can move and stay at position 2.

At time t3, the driving signal 1262 is maintained at a high potential, so the driving signal 1262 may not drive the moving frame 422 so that the optical element 430 does not swing about the moving shaft 42. Accordingly, the light spot formed by the image beam on the virtual plane 1290 may not move along the radial direction of the axis 1220. The driving signal 1263 that changes from a high potential to a low potential can drive the moving frame 423 so that the optical element 430 swings based on the negative direction of the moving shaft 43 (which can be regarded as swinging counterclockwise about the moving shaft 43). When the optical element 430 swings based on the negative direction of the moving shaft 43, the light spot formed by the image beam on the virtual plane 1290 can move along the radial direction of the axis 1230 toward the X-axis direction. The driving signal 1261 is maintained at a low potential, so the driving signal 1261 may not drive the moving frame 421 so that the optical element 430 does not swing about the moving shaft 41. Accordingly, the light spot formed by the image beam on the virtual plane 1290 may not move along the radial direction of the axis 1212. The axis 1212 may be an axis relative to the moving shaft 41 on the virtual plane 1290 when the optical element 430 swings based on the positive direction of the moving shaft 42 and negative direction of the moving shaft 43. Based on the above, at time t3, the light spot formed by the image beam on the virtual plane 1290 can move and stay at position 3.

At time t4, the driving signal 1262 is maintained at a high potential, so the driving signal 1262 may not drive the moving frame 422 so that the optical element 430 does not swing about the moving shaft 42. Accordingly, the light spot formed by the image beam on the virtual plane 1290 may not move along the radial direction of the axis 1220. The driving signal 1263 is maintained at a low potential, so the driving signal 863 may not drive the moving frame 423 so that the optical element 430 does not swing about the moving shaft 43. Accordingly, the light spot formed by the image beam on the virtual plane 1290 may not move along the radial direction of the axis 1230. The driving signal 1261 that changes from a low potential to a high potential may drive the moving frame 421 so that the optical element 430 swings based on the positive direction of the moving shaft 41. When the optical element 430 swings based on the positive direction of the moving shaft 41, the light spot formed by the image beam on the virtual plane 1290 can move along the radial direction of the axis 1212 toward the negative X-axis direction and negative Y-axis direction. Based on the above, at time t4, the light spot formed by the image beam on the virtual plane 1290 can move and stay at position 4.

At time t5, the driving signal 1262 that changes from a high potential to a low potential may drive the moving frame 422 so that the optical element 430 swings based on the negative direction of the moving shaft 42. When the optical element 430 swings based on the negative direction of the moving shaft 42, the light spot formed by the image beam on the virtual plane 1290 can move along the radial direction of the axis 1220 toward the negative Y-axis direction. The driving signal 1263 is maintained at a low potential, so the driving signal 1263 may not drive the moving frame 423 so that the optical element 430 does not swing about the moving shaft 43. Accordingly, the light spot formed by the image beam on the virtual plane 1290 may not move along the radial direction of the axis 1230. The driving signal 1261 is maintained at a high potential, so the driving signal 1261 may not drive the moving frame 421 so that the optical element 430 does not swing about the moving shaft 41. Accordingly, the light spot formed by the image beam on the virtual plane 1290 may not move along the radial direction of the axis 1213. The axis 1213 may be an axis relative to the moving shaft 41 on the virtual plane 1290 when the optical element 430 swings based on the negative directions of the moving shaft 42 and the moving shaft 43. Based on the above, at time t5, the light spot formed by the image beam on the virtual plane 1290 can move and stay at position 5.

At time t6, the driving signal 1262 is maintained at a low potential, so the driving signal 1262 may not drive the moving frame 422 so that the optical element 430 does not swing about the moving shaft 42. Accordingly, the light spot formed by the image beam on the virtual plane 1290 may not move along the radial direction of the axis 1220. The driving signal 1263 is maintained at a low potential, so the driving signal 1263 may not drive the moving frame 423 so that the optical element 430 does not swing about the moving shaft 43. Accordingly, the light spot formed by the image beam on the virtual plane 1290 may not move along the radial direction of the axis 1230. The driving signal 1261 that changes from a high potential to a low potential may drive the moving frame 421 so that the optical element 430 swings based on the negative direction of the moving shaft 41. When the optical element 430 swings based on the negative direction of the moving shaft 41, the light spot formed by the image beam on the virtual plane 1290 can move along the radial direction of the axis 1213 toward the X-axis direction and Y-axis direction. Based on the above, at time t6, the light spot formed by the image beam on the virtual plane 1290 can move and stay at position 6.

At time t7, the driving signal 1262 is maintained at a low potential, so the driving signal 1262 may not drive the moving frame 422 so that the optical element 430 does not swing about the moving shaft 42. Accordingly, the light spot formed by the image beam on the virtual plane 1290 may not move along the radial direction of the axis 1220. The driving signal 1263 that changes from a low potential to a high potential may drive the moving frame 423 so that the optical element 430 swings based on the positive direction of the moving shaft 43. When the optical element 430 swings based on the positive direction of the moving shaft 43, the light spot formed by the image beam on the virtual plane 1290 can move along the radial direction of the axis 1230 toward the negative X-axis direction. The driving signal 1261 is maintained at a low potential, so the driving signal 1261 may not drive the moving frame 421 so that the optical element 430 does not swing about the moving shaft 41. Accordingly, the light spot formed by the image beam on the virtual plane 1290 may not move along the radial direction of the axis 1214. The axis 1214 may be an axis relative to the moving shaft 41 on the virtual plane 1290 when the optical element 430 swings based on the negative direction of the moving shaft 42 and positive direction of the moving shaft 43. Based on the above, at time t7, the light spot formed by the image beam on the virtual plane 1290 can move and stay at position 7.

At time t8, the driving signal 1262 is maintained at a low potential, so the driving signal 1262 may not drive the moving frame 422 so that the optical element 430 does not swing about the moving shaft 42. Accordingly, the light spot formed by the image beam on the virtual plane 1290 may not move along the radial direction of the axis 1220. The driving signal 1263 is maintained at a high potential, so the driving signal 1263 may not drive the moving frame 423 so that the optical element 430 does not swing about the moving shaft 43. Accordingly, the light spot formed by the image beam on the virtual plane 1290 may not move along the radial direction of the axis 1230. The driving signal 1261 that changes from a low potential to a high potential may drive the moving frame 421 so that the optical element 430 swings based on the positive direction of the moving shaft 41. When the optical element 430 swings based on the positive direction of the moving shaft 41, the light spot formed by the image beam on the virtual plane 1290 can move along the radial direction of the axis 1214 toward the negative X-axis direction and negative Y-axis direction. Based on the above, at time t8, the light spot formed by the image beam on the virtual plane 1290 can move and stay at position 8.

At time t9, the driving signal 1262 that changes from a low potential to a high potential may drive the moving frame 422 so that the optical element 430 swings based on the positive direction of the moving shaft 42. When the optical element 430 swings based on the positive direction of the moving shaft 42, the light spot formed by the image beam on the virtual plane 1290 can move along the radial direction of the axis 1220 toward the Y-axis direction. The driving signal 1263 is maintained at a high potential, so the driving signal 1263 may not drive the moving frame 423 so that the optical element 430 does not swing about the moving shaft 43. Accordingly, the light spot formed by the image beam on the virtual plane 1290 may not move along the radial direction of the axis 1230. The driving signal 1261 is maintained at a high potential, so the driving signal 1261 may not drive the moving frame 421 so that the optical element 430 does not swing about the moving shaft 41. Accordingly, the light spot formed by the image beam on the virtual plane 1290 may not move along the radial direction of the axis 1211. Based on the above, at time t9, the light spot formed by the image beam on the virtual plane 1290 can return to position 1.

Figure 13A:
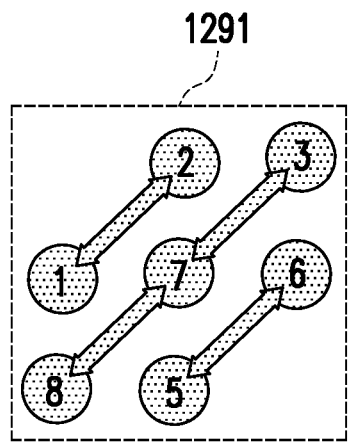
FIG. 13A is a schematic view of a pixel according to an embodiment of the disclosure.

The controller 40 (as shown in FIG. 1A to FIG. 1C) can adjust the swing angle of the frame body 420 when the frame body 420 swings through at least one driving assembly, and thereby the effect of changing the appearance of the pixel 1291 is achieved. FIG. 13A is a schematic view of the pixel 1291 according to an embodiment of the disclosure. The light spot formed by the image beam on the virtual plane 1290 can move in the order of position 1 to position 8, and thereby the pixel 1291 is formed. Referring to the pixel in FIG. 13A mainly (refer to FIG. 4A and FIG. 12A for other reference numerals), in the embodiment, the swing angle corresponding to the moving shaft 41 can be √2 times the swing angle corresponding to the moving shaft 42, and the swing angle corresponding to the moving shaft 42 may be the same as the swing angle corresponding to the moving shaft 43. Therefore, when the image beam is transmitted to the virtual plane 1290 through the reciprocally swinging optical element 430 to form a light spot moving on the virtual plane 1290, the displacement (e.g., the third displacement) of the light spot in the radial direction (e.g., the third radial direction) of the axis 1211 (or axes 1212, 1213, or 1214) corresponding to the moving shaft 41 (e.g., the third moving shaft) can be √2 times the displacement (e.g., the second displacement) of the light spot in the radial direction (e.g., the second radial direction) of the axis 1220 corresponding to the moving shaft 42 (e.g., the second moving shaft), and the displacement (e.g., the third displacement) of the light spot in the radial direction (e.g., the third radial direction) of the axis 1211 (or axes 1212, 1213, or 1214) corresponding to the moving shaft 41 (e.g., the third moving shaft) can be √2 times the displacement (e.g., the first displacement) of the light spot in the radial direction (e.g., the first radial direction) of the axis 1230 corresponding to the moving shaft 43 (e.g., the first moving shaft).

Figure 14A:
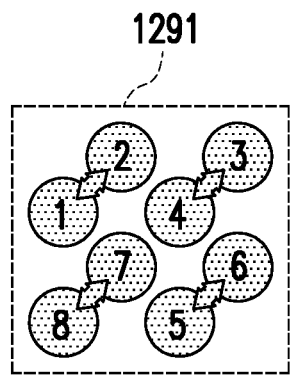
FIG. 14A is a schematic view of a pixel according to another embodiment of the disclosure.

FIG. 14A is a schematic view of the pixel 1291 according to another embodiment of the disclosure. The light spot formed by the image beam on the virtual plane 1290 can move in the order of position 1 to position 8, and thereby the pixel 1291 is formed. Referring to the pixel in FIG. 14A mainly (refer to FIG. 4A and FIG. 12A for other reference numerals), in the embodiment, the swing angle corresponding to the moving shaft 41 can be √2/2 times the swing angle corresponding to the moving shaft 42, and the swing angle corresponding to the moving shaft 42 may be the same as the swing angle corresponding to the moving shaft 43. Therefore, when the image beam is transmitted to the virtual plane 1290 through the reciprocally swinging optical element 430 to form a light spot moving on the virtual plane 1290, the displacement (e.g., the third displacement) of the light spot in the radial direction (e.g., the third radial direction) of the axis 1211 (or axes 1212, 1213, or 1214) corresponding to the moving shaft 41 (e.g., the third moving shaft) can be √2/2 times the displacement (e.g., the second displacement) of the light spot in the radial direction (e.g., the second radial direction) of the axis 1220 corresponding to the moving shaft 42 (e.g., the second moving shaft), and the displacement (e.g., the third displacement) of the light spot in the radial direction (e.g., the third radial direction) of the axis 1211 (or axes 1212, 1213, or 1214) corresponding to the moving shaft 41 (e.g., the third moving shaft) can be √2/2 times the displacement (e.g., the first displacement) of the light spot in the radial direction (e.g., the first radial direction) of the axis 1230 corresponding to the moving shaft 43 (e.g., the first moving shaft).

Figure 15A:
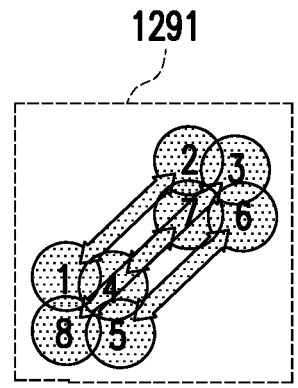
FIG. 15A is a schematic view of a pixel according to yet another embodiment of the disclosure.

FIG. 15A is a schematic view of a pixel according to yet another embodiment of the disclosure. The light spot formed by the image beam on the virtual plane 1290 can move in the order of position 1 to position 8, and thereby the pixel 1291 is formed. Referring to the pixel in FIG. 15A mainly (refer to FIG. 4A and FIG. 12A for other reference numerals), in the embodiment, the swing angle corresponding to the moving shaft 41 can be 2√2 times the swing angle corresponding to the moving shaft 42, and the swing angle corresponding to the moving shaft 42 may be the same as the swing angle corresponding to the moving shaft 43. There-fore, when the image beam is transmitted to the virtual plane 1290 through the reciprocally swinging optical element 430 to form a light spot moving on the virtual plane 1290, the displacement (e.g., the third displacement) of the light spot in the radial direction (e.g., the third radial direction) of the axis 1211 (or axes 1212, 1213, or 1214) corresponding to the moving shaft 41 (e.g., the third moving shaft) can be 2√2 times the displacement (e.g., the second displacement) of the light spot in the radial direction (e.g., the second radial direction) of the axis 1220 corresponding to the moving shaft 42 (e.g., the second moving shaft), and the displacement (e.g., the third displacement) of the light spot in the radial direction (e.g., the third radial direction) of the axis 1211 (or axes 1212, 1213, or 1214) corresponding to the moving shaft 41 (e.g., the third moving shaft) can be 2√2 times the displacement (e.g., the first displacement) of the light spot in the radial direction (e.g., the first radial direction) of the axis 1230 corresponding to the moving shaft 43 (e.g., the first moving shaft).

Figure 13B:
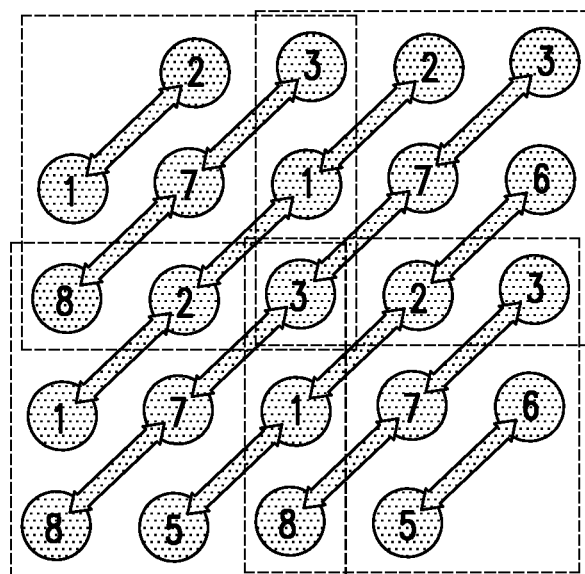
FIG. 13B is a layout view of multiple pixels corresponding to FIG. 13A.
Figure 14B:
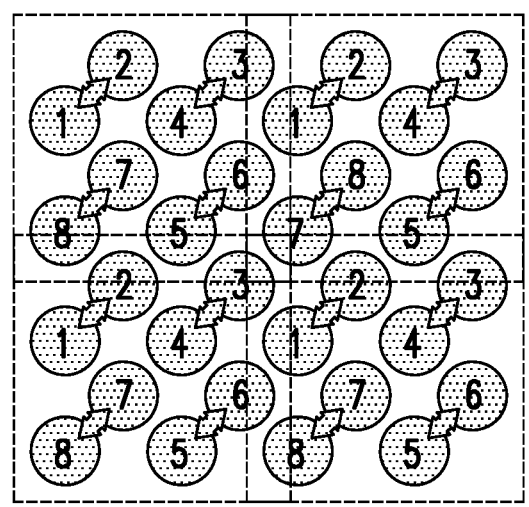
FIG. 14B is a layout view of multiple pixels corresponding to FIG. 14A.
Figure 15B:
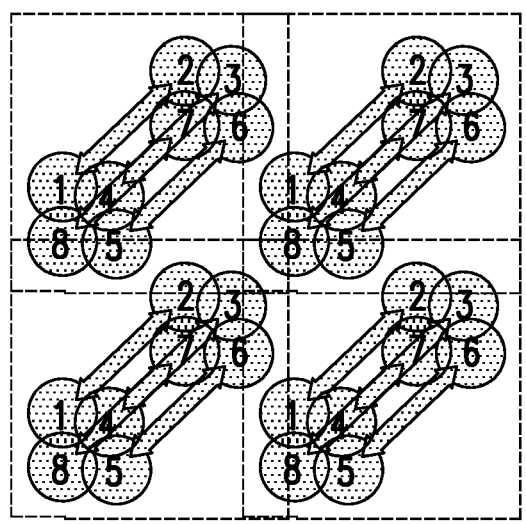
FIG. 15B is a layout view of multiple pixels corresponding to FIG. 15A.

FIG. 13B is a layout view of multiple pixels 1291 corresponding to FIG. 13A. FIG. 14B is a layout view of multiple pixels 1291 corresponding to FIG. 14A. FIG. 15B is a layout view of multiple pixels 1291 corresponding to FIG. 15A. According to FIG. 13B, FIG. 14B, and FIG. 15B, the layout generated by multiple pixels 1291 as shown in FIG. 14A may have a larger pixel density.

According to the embodiments of the disclosure shown in FIG. 4A to FIG. 15B, in the three-axis actuator device 400, the light spots formed by the image beam on the virtual planes 490, 890, and 1290 can move around 8 positions by the various driving methods to form pixels 491, 891, and 1291, respectively, and the resolution of the image beam can be further increased compared with the comparative example of FIG. 2A, FIG. 2B, and FIG. 2C and the comparative example of FIG. 3A, FIG. 3B, and FIG. 3C.

Figure 16A:
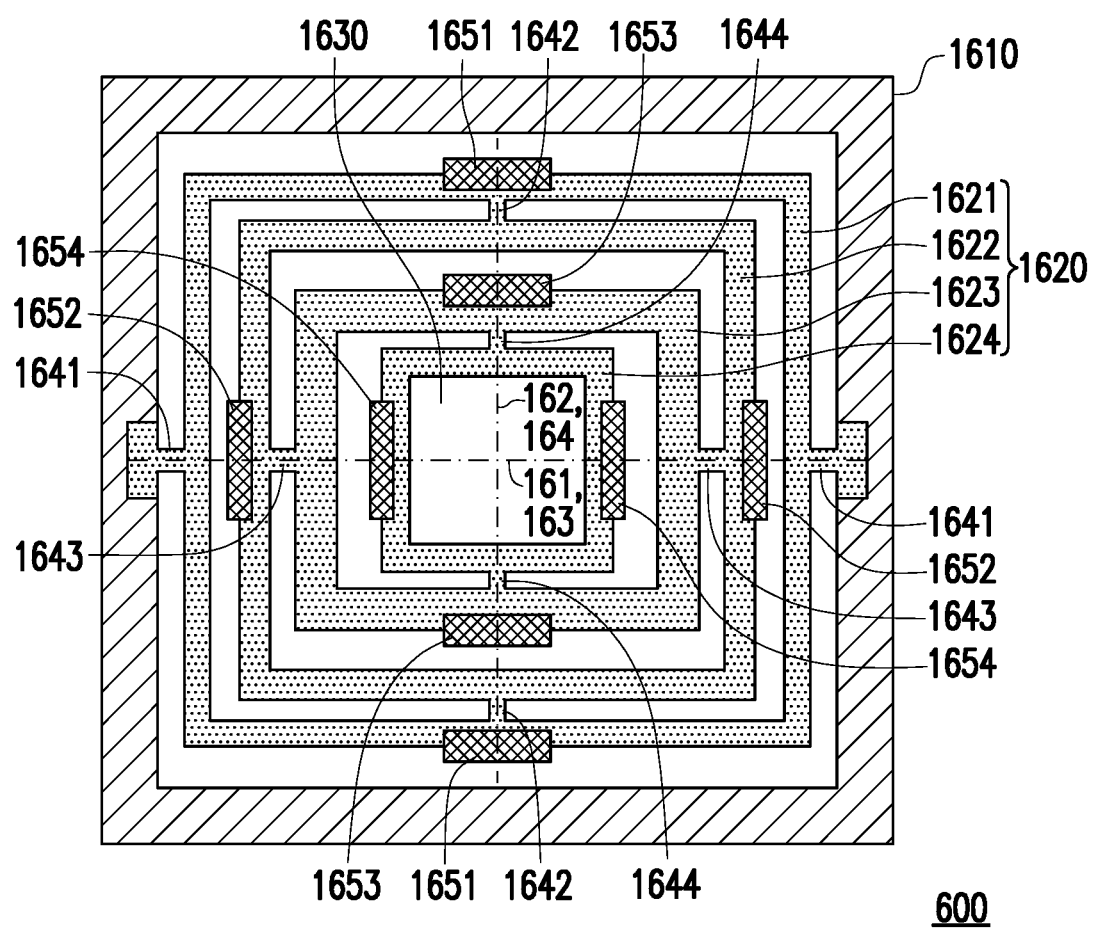
FIG. 16A is a top view of a four-axis actuator device according to an embodiment of the disclosure.
Figure 16B:
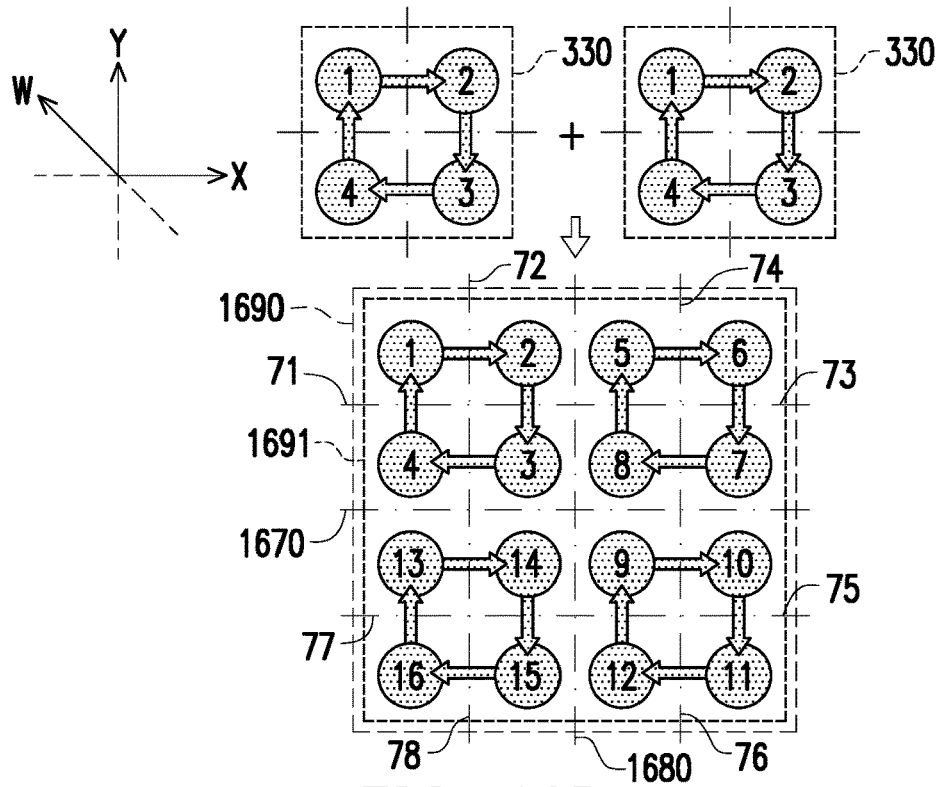
FIG. 16B is a schematic view of the pixels of the actuator device corresponding to FIG. 16A.
Figure 16C:
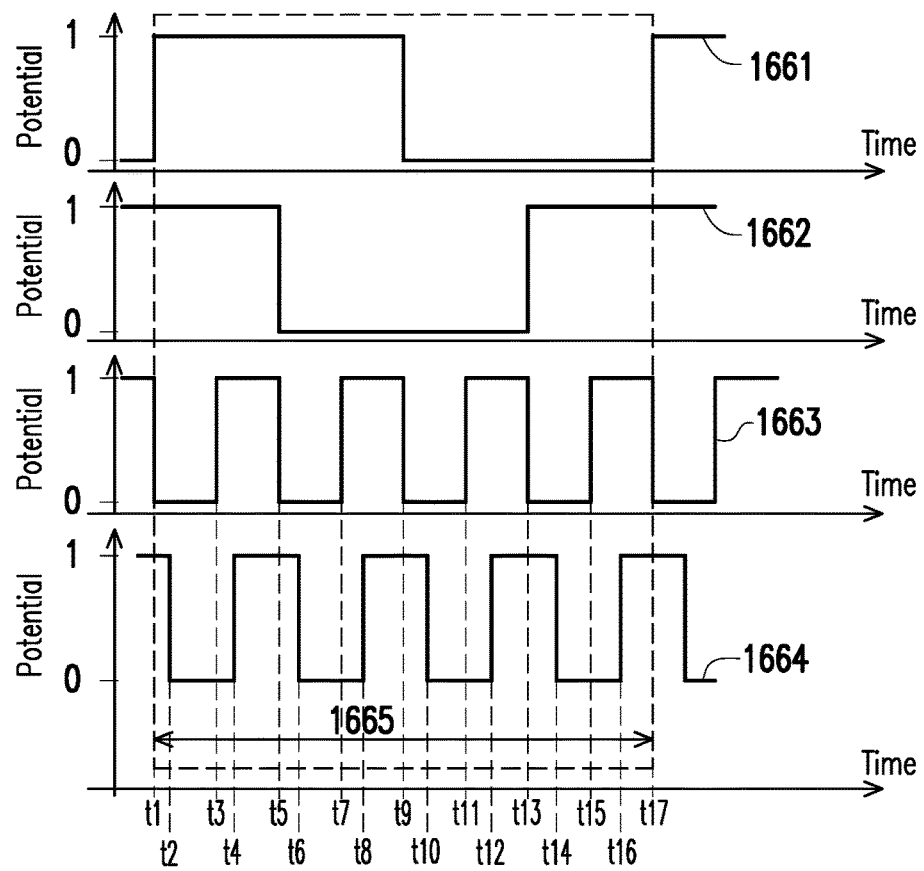
FIG. 16C is a schematic view of driving signals of the actuator device corresponding to FIG. 16A.

Referring to FIG. 1A to FIG. 1C, the actuator device 150 in FIG. 1A to FIG. 1C is a four-axis actuator device 600 in FIG. 16A, for example. In other words, the actuator device 600 of FIG. 16A can be applied to any one of the projection device 100A of FIG. 1A to the projection device 100C of FIG. 1C. Alternatively, the actuator device 600 of FIG. 16A may also be disposed in the projection lens 140 of FIG. 1A or FIG. 1C. FIG. 16A is a top view of the four-axis actuator device 600 according to an embodiment of the disclosure. FIG. 16B is a schematic view of a pixel 1691 of the actuator device 600 corresponding to FIG. 16A. FIG. 16C is a schematic view of driving signals 1661, 1662, 1663, and 1664 of the actuator device 600 corresponding to FIG. 16A. The driving signal 1661 (or the driving signals 1662, 1663, and 1664) is an analog signal or a digital signal, for example. Referring to FIG. 1A to FIG. 1C, FIG. 16A, FIG. 16B, and FIG. 16C, the actuator device 600 may include a base 1610, a frame body 1620, an optical element 1630, and a controller 160 (as shown in FIG. 1A to FIG. 1C). The frame body 1620 may be disposed in the base 1610, and the optical element 1630 may be disposed in the frame body 1620. The frame body 1620 may include a moving frame 1621, a moving frame 1622, a moving frame 1623, and a moving frame 1624. The moving frame 1621 (e.g., the fourth moving frame) may be disposed in the base 1610 and may be connected to the base 1610 through a rotating shaft 1641. The moving frame 1622 (e.g., the third moving frame) can be disposed in the moving frame 1621 and connected to the moving frame 1621 through the rotating shaft 1642. The moving frame 1623 (e.g., the second moving frame) can be disposed in the moving frame 1622 and connected to the moving frame 1622 through the rotating shaft 1643. The moving frame 1624 (e.g., the first moving frame) can be disposed in the moving frame 1623 and connected to the moving frame 1623 through the rotating shaft 1644. The optical element 1630 can be disposed in the moving frame 1624.

The actuator device 600 may further include at least one driving assembly disposed between the base 1610 and the frame body 1620. The at least one driving assembly is a voice coil motor or a piezoelectric material, for example, and the disclosure is not limited thereto. The controller 160 (as shown in FIG. 1A to FIG. 1C) can be coupled to the at least one driving assembly and used to control the at least one driving assembly to drive the frame body 1620 by a signal so that the optical element 1630 reciprocally swings relative to the base 1610 based on the moving shaft 161, the moving shaft 162, the moving shaft 163, or the moving shaft 164. In the embodiment, the moving shaft 161 (e.g., the fourth moving shaft) or the moving shaft 163 (e.g., the second moving shaft) may be parallel to the X-axis direction, and the moving shaft 162 (e.g., the third moving shaft) or the moving shaft 164 (e.g., the first moving shaft) may be parallel to the Y-axis direction. In other words, the moving shaft 161 (or moving shaft 163) may be perpendicular to the moving shaft 162 (or moving shaft 164). The moving shaft 161 and the moving shaft 163 may be coincident. The moving shaft 162 and the moving shaft 164 may be coincident.

Specifically, the at least one driving assembly may include a driving assembly 1651 (e.g., the fourth driving assembly) disposed between the base 1610 and the moving frame 1621. The controller 160 can control the driving assembly 1651 to drive the moving frame 1621 by the driving signal 1661 (e.g., the fourth driving signal) so that the optical element 1630 reciprocally swings relative to the base 1610 based on the moving shaft 161. The number of the driving assembly 1651 can be 1, 2, or N (N is any positive integer). When the number of the driving assembly 1651 is two, two driving assemblies 1651 can be respectively disposed on opposite sides of the moving frame 1621. Moreover, the at least one driving assembly may include a driving assembly 1652 (e.g., the third driving assembly) disposed between the moving frame 1621 and the moving frame 1622. The controller 160 can control the driving assembly 1652 to drive the moving frame 1622 by the driving signal 1662 (e.g., the third driving signal) so that the optical element 1630 reciprocally swings relative to the base 1610 based on the moving shaft 162. The number of the driving assembly 1652 can be 1, 2, or N (N is any positive integer). When the number of the driving assembly 1652 is two, two driving assemblies 1652 can be respectively disposed on opposite sides of the moving frame 1622. When the optical element 1630 reciprocally swings based on the moving shaft 161 and the moving shaft 162, the image beam passing through the optical element 1630 can be transmitted to the virtual plane 1690 to form a light spot moving on the virtual plane 1690, and the movement trajectory of the light spot is similar to the movement trajectory of the light spot in the virtual plane 330 of FIG. 3B. In an embodiment, the driving assembly 1651 may be disposed on the moving shaft 162. The optical element 1652 can be disposed on the moving shaft 161.

Moreover, the at least one driving assembly may include a driving assembly 1653 (e.g., the second driving assembly) disposed between the moving frame 1622 and the moving frame 1623. The controller 160 can control the driving assembly 1653 to drive the moving frame 1623 by the driving signal 1663 (e.g., the second driving signal) so that the optical element 1630 reciprocally swings relative to the base 1610 based on the moving shaft 163. The number of the driving assembly 1653 can be 1, 2, or N (N is any positive integer). When the number of the driving assembly 1653 is two, two driving assemblies 1653 can be respectively disposed on opposite sides of the moving frame 1623. Moreover, the at least one driving assembly may include a driving assembly 1654 (e.g., the first driving assembly) disposed between the moving frame 1623 and the moving frame 1624. The controller 160 can control the driving assembly 1654 to drive the moving frame 1624 by the driving signal 1664 (e.g., the first driving signal) so that the optical element 1630 reciprocally swings relative to the base 1610 based on the moving shaft 164. The number of the driving assembly 1654 can be 1, 2, or N (N is any positive integer). When the number of the driving assembly 1654 is two, two driving assemblies 1654 can be respectively disposed on opposite sides of the moving frame 1624. When the optical element 1630 reciprocally swings based on the moving shaft 163 and the moving shaft 164, the image beam passing through the optical element 1630 can be transmitted to the virtual plane 1690 to form a light spot moving on the virtual plane 1690, and the movement trajectory of the light spot is similar to the movement trajectory of the light spot in the virtual plane 330 of FIG. 3B. In an embodiment, the driving assembly 1653 may be disposed on the moving shaft 164. The optical element 1654 can be disposed on the moving shaft 163.

In the optical element 1630 with four moving shafts, the movement trajectory of the light spot in the virtual plane 1690 is like superimposing two movement trajectories that are the same as the movement trajectory of the light spot in the virtual plane 330. The image beam passing through the optical element 1630 may form a light spot that moves in the order of position 1 to position 16 on the virtual plane 1690, and thereby the moving light spot forms the pixel 1691.

The frequencies (e.g., the second frequency) of the driving signal 1661 and the driving signal 1662 may be the same, and the phase difference between the driving signal 1661 and the driving signal 1662 may not be zero. For example, the phase difference between the driving signal 1661 and the driving signal 1662 may be 90 degrees. The frequencies (e.g., the first frequency) of the driving signal 1663 and the driving signal 1664 may be the same, and the phase difference between the driving signal 1663 and the driving signal 1664 may not be zero. For example, the phase difference between the driving signal 1663 and the driving signal 1664 may be 90 degrees. The frequency (e.g., the second frequency) of the driving signal 1661 (or the driving signal 1662) may be different from the frequency (e.g., the first frequency) of the driving signal 1663 (or the driving signal 1664). In an embodiment, the frequency of the driving signal 1661 (or the driving signal 1662) may be an integer multiple of the frequency of the driving signal 1663 (or the driving signal 1664). For example, the frequency of the driving signal 1661 (or the driving signal 1662) may be four times the frequency of the driving signal 1663 (or the driving signal 1664). In another embodiment, the frequency of the driving signal 1663 (or the driving signal 1664) may be an integer multiple of the frequency of the driving signal 1661 (or the driving signal 1662). For example, the frequency of the driving signal 1663 (or the driving signal 1664) may be four times the frequency of the driving signal 1661 (or the driving signal 1662) as shown in FIG. 16C.

A time interval 1665 may be a period in which the pixel 1691 is generated. Taking the time interval 1665 for example, at time t1, the driving signal 1661 that changes from a low potential to a high potential can drive the moving frame 1621 so that the optical element 1630 swings based on the positive direction of the moving shaft 161 (which can be regarded as swinging clockwise about the moving shaft 161). When the optical element 1630 swings based on the positive direction of the moving shaft 161, the light spot formed by the image beam on the virtual plane 1690 can move along the radial direction of the axis 1670 toward the Y-axis direction, the axis 1670 is the projection of the moving shaft 161 on the virtual plane 1690, and the axis 1670 may be parallel to the X-axis direction. The driving signal 1662 maintained at a high potential may not drive the moving frame 1622 so that the optical element 1630 does not swing based on the moving shaft 162. Accordingly, the light spot formed by the image beam on the virtual plane 1690 may not move along the radial direction of the axis 1680, the axis 1680 is the projection of the moving shaft 162 on the virtual plane 1690, and the axis 1680 may be parallel to the Y-axis direction. The driving signal 1663 that changes from a high potential to a low potential can drive the moving frame 1623 so that the optical element 1630 swings based on the negative direction of the moving shaft 163 (which can be regarded as swinging counterclockwise about the moving shaft 163). When the optical element 1630 swings based on the negative direction of the moving shaft 163, the light spot formed by the image beam on the virtual plane 1690 can move along the radial direction of the axis 71 toward the Y-axis direction. The axis 71 may be an axis relative to the moving shaft 163 on the virtual plane 1690 when the optical element 1630 swings based on the positive directions of the moving shaft 161 and the moving shaft 162. The axis 71 may be parallel to the X-axis direction. The driving signal 1664 maintained at a high potential may not drive the moving frame 1624 so that the optical element 1630 does not swing based on the moving shaft 164. Accordingly, the light spot formed by the image beam on the virtual plane 1690 may not move along the radial direction of the axis 72. The axis 72 may be an axis relative to the moving shaft 164 on the virtual plane 1690 when the optical element 1630 swings based on the positive directions of the moving shaft 161 and the moving shaft 162. The axis 72 may be parallel to the Y-axis direction. Based on the above, at time t1, the light spot formed by the image beam on the virtual plane 1690 can move and stay at position 1.

At time t2, the driving signal 1661 is maintained at a high potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a high potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 is maintained at a low potential, so the driving signal 1663 may not drive the moving frame 1623 so that the optical element 1630 does not swing about the moving shaft 163. Accordingly, the light spot formed by the image beam on the virtual plane 1690 may not move along the radial direction of the axis 71. The driving signal 1664 that changes from a high potential to a low potential can drive the moving frame 1624 so that the optical element 1630 swings based on the negative direction of the moving shaft 164 (which can be regarded as swinging counterclockwise about the moving shaft 164). When the optical element 1630 swings based on the negative direction of the moving shaft 164, the light spot formed by the image beam on the virtual plane 1690 can move along the radial direction of the axis 72 toward the X-axis direction. Based on the above, at time t2, the light spot formed by the image beam on the virtual plane 1690 can move and stay at position 2.

At time t3, the driving signal 1661 is maintained at a high potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a high potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 that changes from a low potential to a high potential may drive the moving frame 1623 so that the optical element 1630 swings based on the positive direction of the moving shaft 163. When the optical element 1630 swings based on the positive direction of the moving shaft 163, the light spot formed by the image beam on the virtual plane 1690 can move along the radial direction of the axis 71 toward the negative Y-axis direction. The driving signal 1664 is maintained at a low potential, so the driving signal 1664 may not drive the moving frame 1624 so that the optical element 1630 does not swing about the moving shaft 164. Accordingly, the light spot formed by the image beam on the virtual plane 1690 may not move along the radial direction of the axis 72. Based on the above, at time t3, the light spot formed by the image beam on the virtual plane 1690 can move and stay at position 3.

At time t4, the driving signal 1661 is maintained at a high potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a high potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 is maintained at a high potential, so the driving signal 1663 may not drive the moving frame 1623 so that the optical element 1630 does not swing about the moving shaft 163. Accordingly, the light spot formed by the image beam on the virtual plane 1690 may not move along the radial direction of the axis 71. The driving signal 1664 that changes from a low potential to a high potential may drive the moving frame 1624 so that the optical element 1630 swings based on the positive direction of the moving shaft 164. When the optical element 1630 swings based on the positive direction of the moving shaft 164, the light spot formed by the image beam on the virtual plane 1690 can move along the radial direction of the axis 72 toward the negative X-axis direction. Based on the above, at time t4, the light spot formed by the image beam on the virtual plane 1690 can move and stay at position 4.

At time t5, the driving signal 1661 is maintained at a high potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 that changes from a high potential to a low potential can drive the moving frame 1622 so that the optical element 1630 swings based on the negative direction of the moving shaft 162 (which can be regarded as swinging counterclockwise about the moving shaft 162). When the optical element 1630 swings based on the negative direction of the moving shaft 162, the light spot formed by the image beam on the virtual plane 1690 can move along the radial direction of the axis 1680 toward the X-axis direction. The driving signal 1663 that changes from a high potential to a low potential may drive the moving frame 1623 so that the optical element 1630 swings based on the negative direction of the moving shaft 163. When the optical element 1630 swings based on the negative direction of the moving shaft 163, the light spot formed by the image beam on the virtual plane 1690 can move along the radial direction of the axis 73 toward the Y-axis direction. The axis 73 may be an axis relative to the moving shaft 163 on the virtual plane 1690 when the optical element 1630 swings based on the positive direction of the moving shaft 161 and negative direction of the moving shaft 162. The axis 73 may be parallel to the X-axis direction. The driving signal 1664 is maintained at a high potential, so the driving signal 1664 may not drive the moving frame 1624 so that the optical element 1630 does not swing about the moving shaft 164. Accordingly, the light spot formed by the image beam on the virtual plane 1690 may not move along the radial direction of the axis 74. The axis 74 may be an axis relative to the moving shaft 164 on the virtual plane 1690 when the optical element 1630 swings based on the positive direction of the moving shaft 161 and negative direction of the moving shaft 162. The axis 74 may be parallel to the Y-axis direction. Based on the above, at time t5, the light spot formed by the image beam on the virtual plane 1690 can move and stay at position 5.

At time t6, the driving signal 1661 is maintained at a high potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a low potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 is maintained at a low potential, so the driving signal 1663 may not drive the moving frame 1623 so that the optical element 1630 does not swing about the moving shaft 163. Accordingly, the light spot formed by the image beam on the virtual plane 1690 may not move along the radial direction of the axis 73. The driving signal 1664 that changes from a high potential to a low potential may drive the moving frame 1624 so that the optical element 1630 swings based on the negative direction of the moving shaft 164. When the optical element 1630 swings based on the negative direction of the moving shaft 164, the light spot formed by the image beam on the virtual plane 1690 can move along the radial direction of the axis 74 toward the X-axis direction. Based on the above, at time t6, the light spot formed by the image beam on the virtual plane 1690 can move and stay at position 6.

At time t7, the driving signal 1661 is maintained at a high potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a low potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 that changes from a low potential to a high potential may drive the moving frame 1623 so that the optical element 1630 swings based on the positive direction of the moving shaft 163. When the optical element 1630 swings based on the positive direction of the moving shaft 163, the light spot formed by the image beam on the virtual plane 1690 can move along the radial direction of the axis 73 toward the negative Y-axis direction. The driving signal 1664 is maintained at a low potential, so the driving signal 1664 may not drive the moving frame 1624 so that the optical element 1630 does not swing about the moving shaft 164. Accordingly, the light spot formed by the image beam on the virtual plane 1690 may not move along the radial direction of the axis 74. Based on the above, at time t7, the light spot formed by the image beam on the virtual plane 1690 can move and stay at position 7.

At time t8, the driving signal 1661 is maintained at a high potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a low potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 is maintained at a high potential, so the driving signal 1663 may not drive the moving frame 1623 so that the optical element 1630 does not swing about the moving shaft 163. Accordingly, the light spot formed by the image beam on the virtual plane 1690 may not move along the radial direction of the axis 73. The driving signal 1664 that changes from a low potential to a high potential may drive the moving frame 1624 so that the optical element 1630 swings based on the positive direction of the moving shaft 164. When the optical element 1630 swings based on the positive direction of the moving shaft 164, the light spot formed by the image beam on the virtual plane 1690 can move along the radial direction of the axis 74 toward the negative X-axis direction. Based on the above, at time t8, the light spot formed by the image beam on the virtual plane 1690 can move and stay at position 8.

At time t9, the driving signal 1661 that changes from a high potential to a low potential may drive the moving frame 1621 so that the optical element 1630 swings based on the negative direction of the moving shaft 161. When the optical element 1630 swings based on the negative direction of the moving shaft 161, the light spot formed by the image beam on the virtual plane 1690 can move along the radial direction of the axis 1670 toward the negative Y-axis direction. The driving signal 1662 is maintained at a low potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 that changes from a high potential to a low potential may drive the moving frame 1623 so that the optical element 1630 swings based on the negative direction of the moving shaft 163. When the optical element 1630 swings based on the negative direction of the moving shaft 163, the light spot formed by the image beam on the virtual plane 1690 can move along the radial direction of the axis 75 toward the Y-axis direction. The axis 75 may be an axis relative to the moving shaft 163 on the virtual plane 1690 when the optical element 1630 swings based on the negative directions of the moving shaft 161 and the moving shaft 162. The axis 75 may be parallel to the X-axis direction. The driving signal 1664 is maintained at a high potential, so the driving signal 1664 may not drive the moving frame 1624 so that the optical element 1630 does not swing about the moving shaft 164. Accordingly, the light spot formed by the image beam on the virtual plane 1690 may not move along the radial direction of the axis 76. The axis 76 may be an axis relative to the moving shaft 164 on the virtual plane 1690 when the optical element 1630 swings based on the negative directions of the moving shaft 161 and the moving shaft 162. The axis 76 may be parallel to the Y-axis direction. Based on the above, at time t9, the light spot formed by the image beam on the virtual plane 1690 can move and stay at position 9.

At time t10, the driving signal 1661 is maintained at a low potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a low potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 is maintained at a low potential, so the driving signal 1663 may not drive the moving frame 1623 so that the optical element 1630 does not swing about the moving shaft 163. Accordingly, the light spot formed by the image beam on the virtual plane 1690 may not move along the radial direction of the axis 75. The driving signal 1664 that changes from a high potential to a low potential may drive the moving frame 1624 so that the optical element 1630 swings based on the negative direction of the moving shaft 164. When the optical element 1630 swings based on the negative direction of the moving shaft 164, the light spot formed by the image beam on the virtual plane 1690 can move along the radial direction of the axis 76 toward the X-axis direction. Based on the above, at time t10, the light spot formed by the image beam on the virtual plane 1690 can move and stay at position 10.

At time t11, the driving signal 1661 is maintained at a low potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a low potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 that changes from a low potential to a high potential may drive the moving frame 1623 so that the optical element 1630 swings based on the positive direction of the moving shaft 163. When the optical element 1630 swings based on the positive direction of the moving shaft 163, the light spot formed by the image beam on the virtual plane 1690 can move toward the negative Y-axis direction along the radial direction of the axis 75. The driving signal 1664 is maintained at a low potential, so the driving signal 1664 may not drive the moving frame 1624 so that the optical element 1630 does not swing about the moving shaft 164. Accordingly, the light spot formed by the image beam on the virtual plane 1690 may not move along the radial direction of the axis 76. Based on the above, at time t11, the light spot formed by the image beam on the virtual plane 1690 can move and stay at position 11.

At time t12, the driving signal 1661 is maintained at a low potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a low potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 is maintained at a high potential, so the driving signal 1663 may not drive the moving frame 1623 so that the optical element 1630 does not swing about the moving shaft 163. Accordingly, the light spot formed by the image beam on the virtual plane 1690 may not move along the radial direction of the axis 75. The driving signal 1664 that changes from a low potential to a high potential may drive the moving frame 1624 so that the optical element 1630 swings based on the positive direction of the moving shaft 164. When the optical element 1630 swings based on the positive direction of the moving shaft 164, the light spot formed by the image beam on the virtual plane 1690 can move along the radial direction of the axis 76 toward the negative X-axis direction. Based on the above, at time t12, the light spot formed by the image beam on the virtual plane 1690 can move and stay at position 12.

At time t13, the driving signal 1661 is maintained at a low potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 that changes from a low potential to a high potential may drive the moving frame 1622 so that the optical element 1630 swings based on the positive direction of the moving shaft 162. When the optical element 1630 swings based on the positive direction of the moving shaft 162, the light spot formed by the image beam on the virtual plane 1690 can move along the radial direction of the axis 1680 toward the negative X-axis direction. The driving signal 1663 that changes from a high potential to a low potential may drive the moving frame 1623 so that the optical element 1630 swings based on the negative direction of the moving shaft 163. When the optical element 1630 swings based on the negative direction of the moving shaft 163, the light spot formed by the image beam on the virtual plane 1690 can move along the radial direction of the axis 77 toward the Y-axis direction. The axis 77 may be an axis relative to the moving shaft 163 on the virtual plane 1690 when the optical element 1630 swings based on the negative direction of the moving shaft 161 and positive direction of the moving shaft 162. The axis 77 may be parallel to the X-axis direction. The driving signal 1664 is maintained at a high potential, so the driving signal 1664 may not drive the moving frame 1624 so that the optical element 1630 does not swing about the moving shaft 164. Accordingly, the light spot formed by the image beam on the virtual plane 1690 may not move along the radial direction of the axis 78. The axis 78 may be an axis relative to the moving shaft 164 on the virtual plane 1690 when the optical element 1630 swings based on the negative direction of the moving shaft 161 and positive direction of the moving shaft 162. The axis 78 may be parallel to the Y-axis direction. Based on the above, at time t13, the light spot formed by the image beam on the virtual plane 1690 can move and stay at position 13.

At time t14, the driving signal 1661 is maintained at a low potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a high potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 is maintained at a low potential, so the driving signal 1663 may not drive the moving frame 1623 so that the optical element 1630 does not swing about the moving shaft 163. Accordingly, the light spot formed by the image beam on the virtual plane 1690 may not move along the radial direction of the axis 77. The driving signal 1664 that changes from a high potential to a low potential may drive the moving frame 1624 so that the optical element 1630 swings based on the negative direction of the moving shaft 164. When the optical element 1630 swings based on the negative direction of the moving shaft 164, the light spot formed by the image beam on the virtual plane 1690 can move along the radial direction of the axis 78 toward the X-axis direction. Based on the above, at time t14, the light spot formed by the image beam on the virtual plane 1690 can move and stay at position 14.

At time t15, the driving signal 1661 is maintained at a low potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a high potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 that changes from a low potential to a high potential may drive the moving frame 1623 so that the optical element 1630 swings based on the positive direction of the moving shaft 163. When the optical element 1630 swings based on the positive direction of the moving shaft 163, the light spot formed by the image beam on the virtual plane 1690 can move along the radial direction of the axis 77 toward the negative Y-axis direction. The driving signal 1664 is maintained at a low potential, so the driving signal 1664 may not drive the moving frame 1624 so that the optical element 1630 does not swing about the moving shaft 164. Accordingly, the light spot formed by the image beam on the virtual plane 1690 may not move along the radial direction of the axis 78. Based on the above, at time t15, the light spot formed by the image beam on the virtual plane 1690 can move and stay at position 15.

At time t16, the driving signal 1661 is maintained at a low potential, so the driving signal 1661 may not drive the moving frame 1621 so that the optical element 1630 does not swing about the moving shaft 161. Accordingly, the light spot formed by the image beam on the virtual plane 1690 may not move along the radial direction of the axis 1670. The driving signal 1662 is maintained at a high potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 is maintained at a high potential, so the driving signal 1663 may not drive the moving frame 1623 so that the optical element 1630 does not swing about the moving shaft 163. Accordingly, the light spot formed by the image beam on the virtual plane 1690 may not move along the radial direction of the axis 77. The driving signal 1664 that changes from a low potential to a high potential may drive the moving frame 1624 so that the optical element 1630 swings based on the positive direction of the moving shaft 164. When the optical element 1630 swings based on the positive direction of the moving shaft 164, the light spot formed by the image beam on the virtual plane 1690 can move along the radial direction of the axis 78 toward the negative X-axis direction. Based on the above, at time t16, the light spot formed by the image beam on the virtual plane 1690 can move and stay at position 16.

At time t17, the driving signal 1661 that changes from a low potential to a high potential may drive the moving frame 1621 so that the optical element 1630 swings based on the positive direction of the moving shaft 161. When the optical element 1630 swings based on the positive direction of the moving shaft 161, the light spot formed by the image beam on the virtual plane 1690 can move along the radial direction of the axis 1670 toward the Y-axis direction. The driving signal 1662 is maintained at a high potential, so the driving signal 1662 may not drive the moving frame 1622 so that the optical element 1630 does not swing about the moving shaft 162. Accordingly, the light spot formed by the image beam on the virtual plane 1690 may not move along the radial direction of the axis 1680. The driving signal 1663 that changes from a high potential to a low potential may drive the moving frame 1623 so that the optical element 1630 swings based on the negative direction of the moving shaft 163. When the optical element 1630 swings based on the negative direction of the moving shaft 163, the light spot formed by the image beam on the virtual plane 1690 can move along the radial direction of the axis 71 toward the Y-axis direction. The driving signal 1664 is maintained at a high potential, so the driving signal 1664 may not drive the moving frame 1624 so that the optical element 1630 does not swing about the moving shaft 164. Accordingly, the light spot formed by the image beam on the virtual plane 1690 may not move along the radial direction of the axis 72. Based on the above, at time t17, the light spot formed by the image beam on the virtual plane 1690 can move and return to position 1.

Figure 17A:
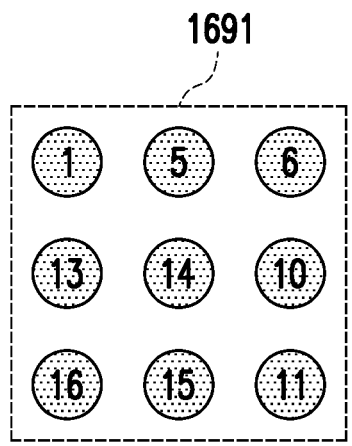
FIG. 17A is a schematic view of a pixel according to an embodiment of the disclosure.

The controller 160 (as shown in FIG. 1A to FIG. 1C) can adjust the swing angle of the frame body 1620 when the frame body 1620 swings through at least one driving assembly, and thereby the effect of changing the appearance of the pixel 1691 is achieved. FIG. 17A is a schematic view of the pixel 1691 according to an embodiment of the disclosure. The light spot formed by the image beam on the virtual plane 1690 can move in the order of position 1 to position 16, and thereby the pixel 1691 is formed. Position 2 overlaps with position 5; position 4 overlaps with position 13; position 7 overlaps with position 10; position 3, position 8, and position 9 overlap with position 14; and position 12 overlaps with position 15, so position 2, position 3, position 4, position 7, position 8, position 9, and position 12 are not shown in FIG. 17A. Referring to the pixel in FIG. 17A mainly (refer to FIG. 16A and FIG. 16B for other reference numerals), in the embodiment, the swing angle corresponding to the moving shaft 161, the swing angle corresponding to the moving shaft 162, the swing angle corresponding to the moving shaft 163, and the swing angle corresponding to the moving shaft 164 may be the same. Therefore, when the image beam is transmitted to the virtual plane 1690 through the reciprocally swinging optical element 1630 to form a light spot moving on the virtual plane 1690, the displacement (e.g., the fourth displacement) of the light spot in the radial direction (e.g., the fourth radial direction) of the axis 1670 corresponding to the moving shaft 161 (e.g., the fourth moving shaft), the displacement (e.g., the third displacement) of the light spot in the radial direction (e.g., the third radial direction) of the axis 1680 corresponding to the moving shaft 162 (e.g., the third moving shaft), the displacement (e.g., the second displacement) of the light spot in the radial direction (e.g., the second radial direction) of the axis 71 (or axes 73, 75, or 77) corresponding to the moving shaft 163 (e.g., the second moving shaft), and the displacement (e.g., the first displacement) of the light spot in the radial direction (e.g., the first radial direction) of the axis 72 (or axes 74, 76, or 78) corresponding to the moving shaft 164 (e.g., the first moving shaft) can be the same.

Figure 18A:
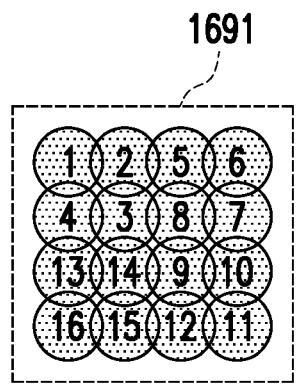
FIG. 18A is a schematic view of a pixel according to another embodiment of the disclosure.

FIG. 18A is a schematic view of the pixel 1691 according to another embodiment of the disclosure. The light spot formed by the image beam on the virtual plane 1690 can move in the order of position 1 to position 16, and thereby the pixel 1691 is formed. Referring to the pixel in FIG. 18A mainly (refer to FIG. 16A and FIG. 16B for other reference numerals), in the embodiment, the swing angle corresponding to the moving shaft 161 (or the swing angle corresponding to the moving shaft 162) can be two times the swing angle corresponding to the moving shaft 163 (or the swing angle corresponding to the moving shaft 164). Therefore, when the image beam is transmitted to the virtual plane 1690 through the reciprocally swinging optical element 1630 to form a light spot moving on the virtual plane 1690, the displacement (e.g., the fourth displacement or the third displacement) of the light spot in the radial directions (e.g., the fourth radial direction or the third radial direction) of the axis 1670 corresponding to the moving shaft 161 (e.g., the fourth moving shaft) or the axis 1680 corresponding to the moving shaft 162 (e.g., the third moving shaft) can be two times the displacement (e.g., the second displacement or the first displacement) of the light spot in the radial directions (e.g., the second radial direction or the first radial direction) of the axis 71 (or axes 73, 75, and 77) corresponding to the moving shaft 163 (e.g., the second moving shaft) or the axis 72 (or axes 74, 76, or 78) corresponding to the moving shaft 164 (e.g., the first moving shaft).

Figure 19A:
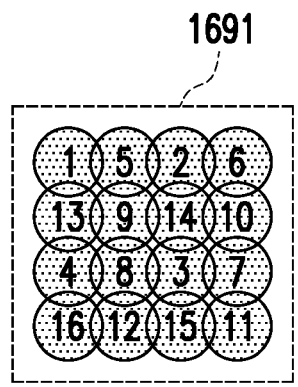
FIG. 19A is a schematic view of a pixel according to yet another embodiment of the disclosure.

FIG. 19A is a schematic view of the pixel 1691 according to yet another embodiment of the disclosure. The light spot formed by the image beam on the virtual plane 1690 can move in the order of position 1 to position 16, and thereby the pixel 1691 is formed. Referring to the pixel in FIG. 19A mainly (refer to FIG. 16A and FIG. 16B for other reference numerals), in the embodiment, the swing angle corresponding to the moving shaft 161 (or the swing angle corresponding to the moving shaft 162) can be ½ times the swing angle corresponding to the moving shaft 163 (or the swing angle corresponding to the moving shaft 164). Therefore, when the image beam is transmitted to the virtual plane 1690 through the reciprocally swinging optical element 1630 to form a light spot moving on the virtual plane 1690, the displacement (e.g., the fourth displacement or the third displacement) of the light spot in the radial directions (e.g., the fourth radial direction or the third radial direction) of the axis 1670 corresponding to the moving shaft 161 (e.g., the fourth moving shaft) or the axis 1680 corresponding to the moving shaft 162 (e.g., the third moving shaft) can be ½ times the displacement (e.g., the second displacement or the first displacement) of the light spot in the radial direction (e.g., the second radial direction or the first radial direction) of the axis 71 (or axes 73, 75, and 77) corresponding to the moving shaft 163 (e.g., the second moving shaft) or the axis 72 (or axes 74, 76, or 78) corresponding to the moving shaft 164 (e.g., the first moving shaft).

Figure 17B:
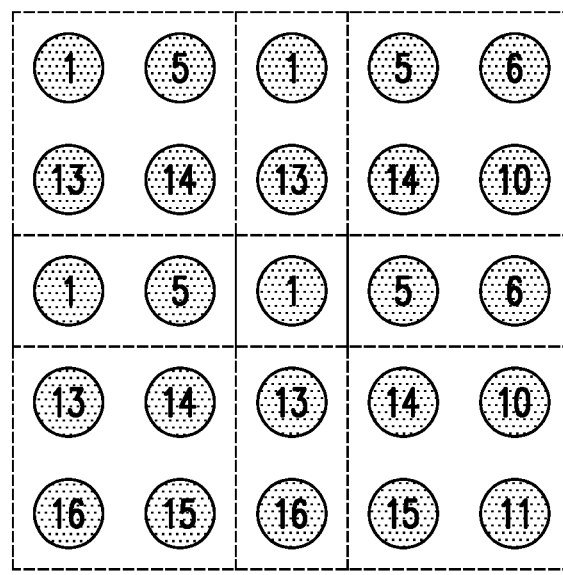
FIG. 17B is a layout view of multiple pixels corresponding to FIG. 17A.
Figure 18B:
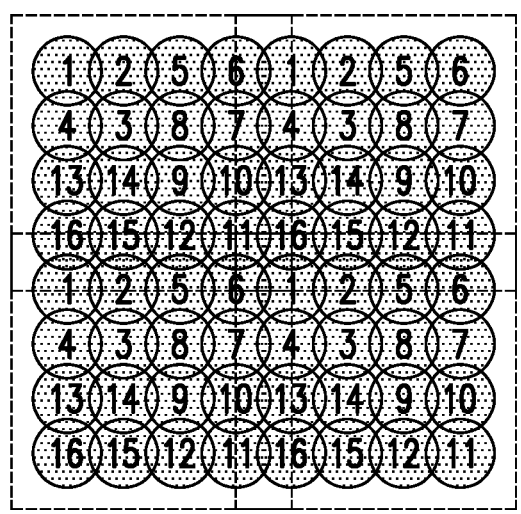
FIG. 18B is a layout view of multiple pixels corresponding to FIG. 18A.
Figure 19B:
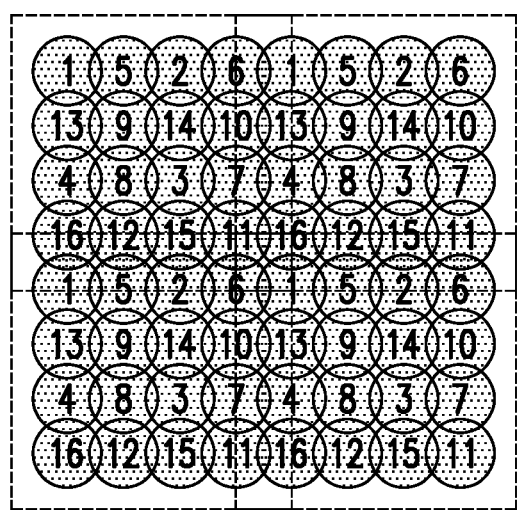
FIG. 19B is a layout view of multiple pixels corresponding to FIG. 19A.

FIG. 17B is a layout view of multiple pixels 1691 corresponding to FIG. 17A. FIG. 18B is a layout view of multiple pixels 1691 corresponding to FIG. 18A. FIG. 19B is a layout view of multiple pixels 1691 corresponding to FIG. 19A. According to FIG. 17B, FIG. 18B, and FIG. 19B, the layout generated by multiple pixels 1691 as shown in FIG. 18A and in FIG. 19A may have a larger pixel density.

According to the embodiments of the disclosure shown in FIG. 16A to FIG. 19B, in the four-axis actuator device 600, the light spots formed by the image beam on the virtual planes 1690 can move around 16 positions by the various driving methods to form the pixel 1691 and the resolution of the image beam can be further increased compared with the comparative example of FIG. 2A, FIG. 2B, and FIG. 2C and the comparative example of FIG. 3A, FIG. 3B, and FIG. 3C.

Figure 20:
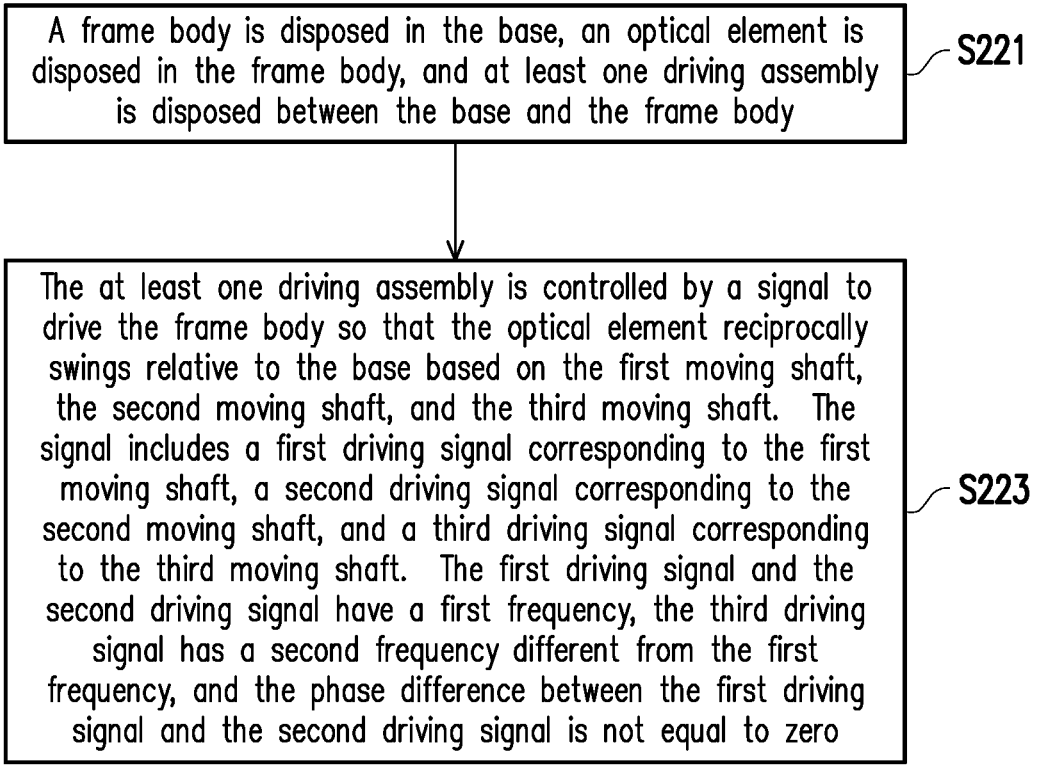
FIG. 20 is a flowchart of a projection method according to an embodiment of the disclosure.

FIG. 20 is a flowchart of a projection method according to an embodiment of the disclosure. The projection method may be implemented by the actuator device 150 shown in FIG. 1A to FIG. 1C, the actuator device 400 shown in FIG. 4A, or the actuator device 600 shown in FIG. 16A. In step S221, a frame body is disposed in a base, an optical element is disposed in the frame body, and at least one driving assembly is disposed between the base and the frame body. In step S223, at least one driving assembly is controlled by a signal to drive the frame body so that the optical element reciprocally swings relative to the base based on the first moving shaft, the second moving shaft, and the third moving shaft. The signal includes a first driving signal corresponding to the first moving shaft, a second driving signal corresponding to the second moving shaft, and a third driving signal corresponding to the third moving shaft. The first driving signal and the second driving signal have a first frequency, the third driving signal has a second frequency different from the first frequency, and the phase difference between the first driving signal and the second driving signal is not equal to zero.

Based on the above, the actuator device of the disclosure can be disposed in multiple positions in the projection device, and the actuator device can include at least three moving shafts. The actuator device can control the optical element to reciprocally swing based on each moving shaft according to the corresponding driving frequency, so that the beam passing through the optical element generates a light spot moving along a fixed path on a virtual plane, thereby forming a pixel. Compared with conventional actuators, the actuator device of the disclosure includes more moving shafts. Therefore, in the disclosure, the light spot formed by the image beam on the virtual plane can move around more positions, thereby further increasing the resolution of the projection device. The actuator device can generate pixels of a specific shape by configuring the driving frequency of each moving shaft. The user can adjust the driving frequency of the actuator device according to the requirements of the pixel layout, thereby adjusting the shape of the pixel, which contributes to the increase of the pixel density.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An actuator device, wherein the actuator device comprises a base, a frame body, an optical element, at least one driving assembly, and a controller, wherein
the frame body is disposed in the base;
the optical element is disposed in the frame body;
the at least one driving assembly is disposed between the base and the frame body; and
the controller is coupled to the at least one driving assembly,
wherein the controller is adapted to control the at least one driving assembly to drive the frame body by a signal so that the optical element reciprocally swings relative to the base based on a first moving shaft, a second moving shaft, and a third moving shaft,
wherein the signal comprises a first driving signal corresponding to the first moving shaft, a second driving signal corresponding to the second moving shaft, and a third driving signal corresponding to the third moving shaft,
wherein the first driving signal and the second driving signal comprise a first frequency, and the third driving signal comprises a second frequency different from the first frequency,
wherein a phase difference between the first driving signal and the second driving signal is not equal to zero.

2. The actuator device of claim 1, wherein one of the first frequency and the second frequency is an integer multiple of the other of the first frequency and the second frequency.

3. The actuator device of claim 2, wherein the integer multiple comprises two times or four times.

4. The actuator device of claim 1, wherein an image beam is transmitted to a virtual plane through the reciprocally swinging optical element to form a light spot that moves on the virtual plane, wherein a third displacement of the light spot in a third radial direction of the third moving shaft is $\sqrt{2}/2$ times a first displacement of the light spot in a first radial direction of the first moving shaft.

5. The actuator device of claim 1, wherein the first moving shaft is perpendicular to the second moving shaft.

6. The actuator device of claim 5, wherein the third moving shaft extends along an angular bisector of the first moving shaft and the second moving shaft.

7. The actuator device of claim 1, wherein the frame body comprises:
a first moving frame, a second moving frame, and a third moving frame,
wherein the optical element is disposed in the first moving frame;
the first moving frame is disposed in the second moving frame and connected to the second moving frame;
the second moving frame is disposed in the third moving frame and connected to the third moving frame; and
the third moving frame is disposed in the base and connected to the base.

8. The actuator device of claim 7, wherein the at least one driving assembly comprises:
at least one first driving assembly, at least one second driving assembly, and at least one third driving assembly, wherein
the at least one first driving assembly is located between the first moving frame and the second moving frame;
the at least one second driving assembly is located between the second moving frame and the third moving frame; and
the at least one third driving assembly is located between the third moving frame and the base.

9. The actuator device of claim 8, wherein
the at least one first driving assembly comprises two first driving assemblies respectively located on opposite sides of the first moving frame;
the at least one second driving assembly comprises two second driving assemblies respectively located on opposite sides of the second moving frame; and
the at least one third driving assembly comprises two third driving assemblies respectively located on opposite sides of the third moving shaft.

10. The actuator device of claim 8, wherein
the at least one first driving assembly is located on the second moving shaft; and
the at least one second driving assembly is located on the first moving shaft.

11. The actuator device of claim 1, wherein the signal further comprises a fourth driving signal, wherein the controller is adapted for controlling the at least one driving assembly to drive the frame body through the fourth driving signal so that the optical element reciprocally swings relative to the base based on a fourth moving shaft.

12. The actuator device of claim 11, wherein the fourth driving signal comprises the second frequency, wherein a phase difference between the third driving signal and the fourth driving signal is not equal to zero.

13. The actuator device of claim 11, wherein the third moving shaft is parallel to the first moving shaft, and the fourth moving shaft is parallel to the second moving shaft.

14. The actuator device of claim 11, wherein the frame body comprises a first moving frame, a second moving frame, a third moving frame, and a fourth moving frame, wherein
the optical element is disposed in the first moving frame;
the first moving frame is disposed in the second moving frame and connected to the second moving frame;
the second moving frame is disposed in the third moving frame and connected to the third moving frame;
the third moving frame is disposed in the fourth moving frame and connected to the fourth moving frame; and
the fourth moving frame is disposed in the base and connected to the base.

15. The actuator device of claim 11, wherein the at least one driving assembly comprises at least one first driving assembly, at least one second driving assembly, at least one third driving assembly, and at least one fourth driving assembly, wherein
the at least one first driving assembly is located between the first moving frame and the second moving frame;
the at least one second driving assembly is located between the second moving frame and the third moving frame;
the at least one third driving assembly is located between the third moving frame and the fourth moving frame; and
the at least one fourth driving assembly is located between the fourth moving frame and the base.

16. The actuator device of claim 15, wherein
the at least one first driving assembly comprises two first driving assemblies respectively located on opposite sides of the first moving frame;
the at least one second driving assembly comprises two second driving assemblies respectively located on opposite sides of the second moving frame;
the at least one third driving assembly comprises two third driving assemblies respectively located on opposite sides of the third moving frame; and
the at least one fourth driving assembly comprises two fourth driving assemblies respectively located on opposite sides of the fourth moving frame.

17. The actuator device of claim 15, wherein
the at least one first driving assembly is located on the second moving shaft;
the at least one second driving assembly is located on the first moving shaft;
the at least one third driving assembly is located on the fourth moving shaft; and
the at least one fourth driving assembly is located on the third moving shaft.

18. The actuator device of claim 1, wherein the at least one driving assembly comprises a voice coil motor or a piezoelectric material.

19. A projection device, wherein the projection device comprises an illumination system, a light valve, a projection lens, and an actuator device, wherein
the illumination system is adapted to emit an illumination beam;
the light valve is located on a transmission path of the illumination beam, and the light valve is adapted to convert the illumination beam into an image beam;
the projection lens is located on a transmission path of the image beam, and the projection lens is adapted to project the image beam; and
the actuator device is located on a transmission path of the image beam, and the actuator device is disposed between the light valve and the projection lens or disposed in the projection lens, wherein the actuator device comprises a base, a frame body, an optical element, at least one driving assembly, and a controller, wherein
the frame body is disposed in the base;
the optical element is disposed in the frame body;
the at least one driving assembly is disposed between the base and the frame body; and
the controller is coupled to the at least one driving assembly,
wherein the controller is adapted to control the at least one driving assembly to drive the frame body by a signal so that the optical element reciprocally swings relative to the base based on a first moving shaft, a second moving shaft, and a third moving shaft,
wherein the signal comprises a first driving signal corresponding to the first moving shaft, a second driving signal corresponding to the second moving shaft, and a third driving signal corresponding to the third moving shaft,
wherein the first driving signal and the second driving signal comprise a first frequency, and the third driving signal comprises a second frequency different from the first frequency,
wherein a phase difference between the first driving signal and the second driving signal is not equal to zero.

20. The projection device of claim 19, wherein the projection device further comprises a prism, the prism is located on a transmission path of the image beam, and the prism is disposed between the light valve and the projection lens,
wherein the actuator device is disposed between the prism and the light valve.

21. The projection device of claim 19, wherein the projection device further comprises a prism, the prism is located on a transmission path of the image beam, and the prism is disposed between the light valve and the projection lens,
wherein the actuator device is disposed between the prism and the projection lens.

22. A projection method, adapted for an actuator device, wherein the actuator device comprises a base, a frame body, an optical element, and at least one driving assembly, wherein the projection method comprises:
disposing the frame body in the base, disposing the optical element in the frame body, and disposing the at least one driving assembly between the base and the frame body; and
controlling the at least one driving assembly to drive the frame body by a signal so that the optical element reciprocally swings relative to the base based on a first moving shaft, a second moving shaft, and a third moving shaft,
wherein the signal comprises a first driving signal corresponding to the first moving shaft, a second driving signal corresponding to the second moving shaft, and a third driving signal corresponding to the third moving shaft, wherein the first driving signal and the second driving signal comprise a first frequency, and the third driving signal comprises a second frequency different from the first frequency, wherein a phase difference between the first driving signal and the second driving signal is not equal to zero.

\* \* \* \* \*